United States Patent [19]

Ito et al.

[11] Patent Number: 5,117,412

[45] Date of Patent: May 26, 1992

[54] OPTICAL DISC WITH SERVO PATTERN PROVIDING ENHANCED RELIABILITY OF SERVO CLOCK DETECTION AND APPARATUS FOR ACCESSING THE OPTICAL DISC

[75] Inventors: Osamu Ito; Masaharu Ogawa; Kyosuke Yoshimoto; Kunimaro Tanaka; Teruo Furukawa; Yoshiki Nakajima, all of Amagasaki, Japan

[73] Assignee: Mitsubishi Denki Kabushiki Kaisha, Japan

[21] Appl. No.: 526,285

[22] Filed: May 21, 1990

Related U.S. Application Data

[62] Division of Ser. No. 166,671, Mar. 11, 1988, Pat. No. 5,063,546.

[30] Foreign Application Priority Data

Mar. 13, 1987 [JP] Japan ................................ 62-59537
Jun. 2, 1987 [JP] Japan ................................ 62-138585
Jun. 16, 1987 [JP] Japan ................................ 62-149586

[51] Int. Cl.[5] .............................................. G11B 7/12
[52] U.S. Cl. .................................... 369/109; 369/32; 369/50; 369/124; 369/275.3
[58] Field of Search ................ 369/32, 44.26, 44.34, 369/50, 54, 58, 59, 109, 124, 275.3, 275.4

[56] References Cited

U.S. PATENT DOCUMENTS

| | | | |
|---|---|---|---|
| 4,094,013 | 6/1978 | Hill et al. | 369/275.3 X |
| 4,499,572 | 2/1985 | Yoshikawa et al. | 369/124 X |
| 4,562,564 | 12/1985 | Bricot et al. | 369/275.3 X |
| 4,564,929 | 1/1986 | Yonezawa et al. | 369/275.3 X |
| 4,646,103 | 2/1987 | Sugiyama et al. | 369/275.4 X |
| 4,663,751 | 5/1987 | Kaku et al. | 369/275.3 X |
| 4,674,081 | 6/1987 | Gerard et al. | 369/275.3 |
| 4,748,609 | 5/1988 | Yonezawa et al. | 369/275.3 X |
| 4,761,772 | 8/1988 | Murakami | 369/275.3 X |
| 4,847,703 | 7/1989 | Sakata et al. | 360/48 |
| 4,914,645 | 4/1990 | Getreuer et al. | 369/275.4 X |

Primary Examiner—Roy N. Envall, Jr.
Assistant Examiner—W. R. Young
Attorney, Agent, or Firm—Wolf, Greenfield, & Sacks

[57] ABSTRACT

An optical disc having a plurality of information tracks. Each information track having a data field including multiple data bytes and a servo field including a first servo byte having a pair of wobbled pits and a second servo byte having a clock pit. The byte length of at least one of the first or second servo bytes being longer than the byte lengths of the data bytes. The increased byte length providing for greater distance between the wobbled pits and the clock pit resulting in increased reliability in clock pit detection. An accessing apparatus for accessing such an optical disc including a phase-locked loop circuit with a frequency dividing ratio that varies in accordance with the various byte lengths.

2 Claims, 18 Drawing Sheets

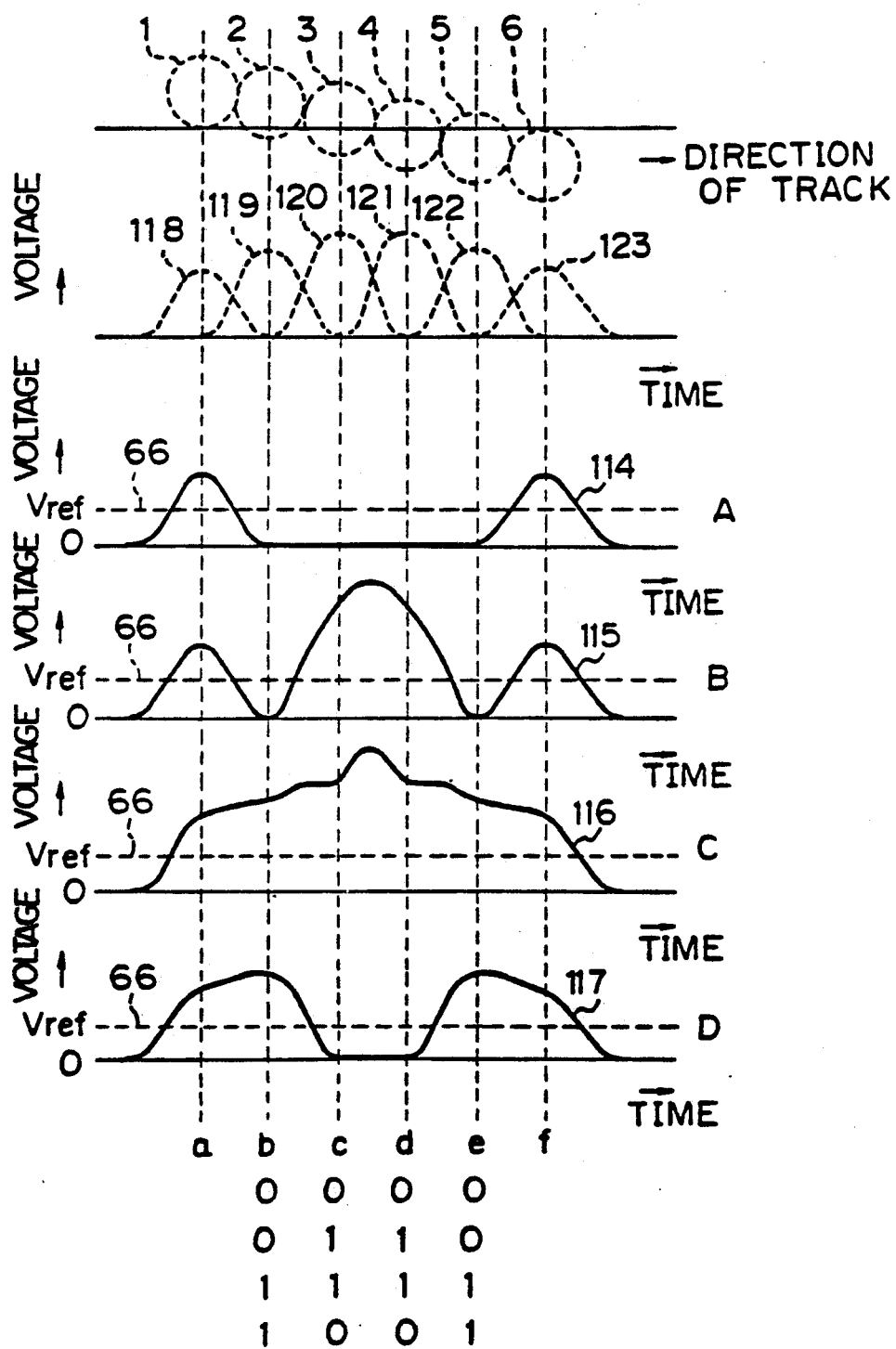

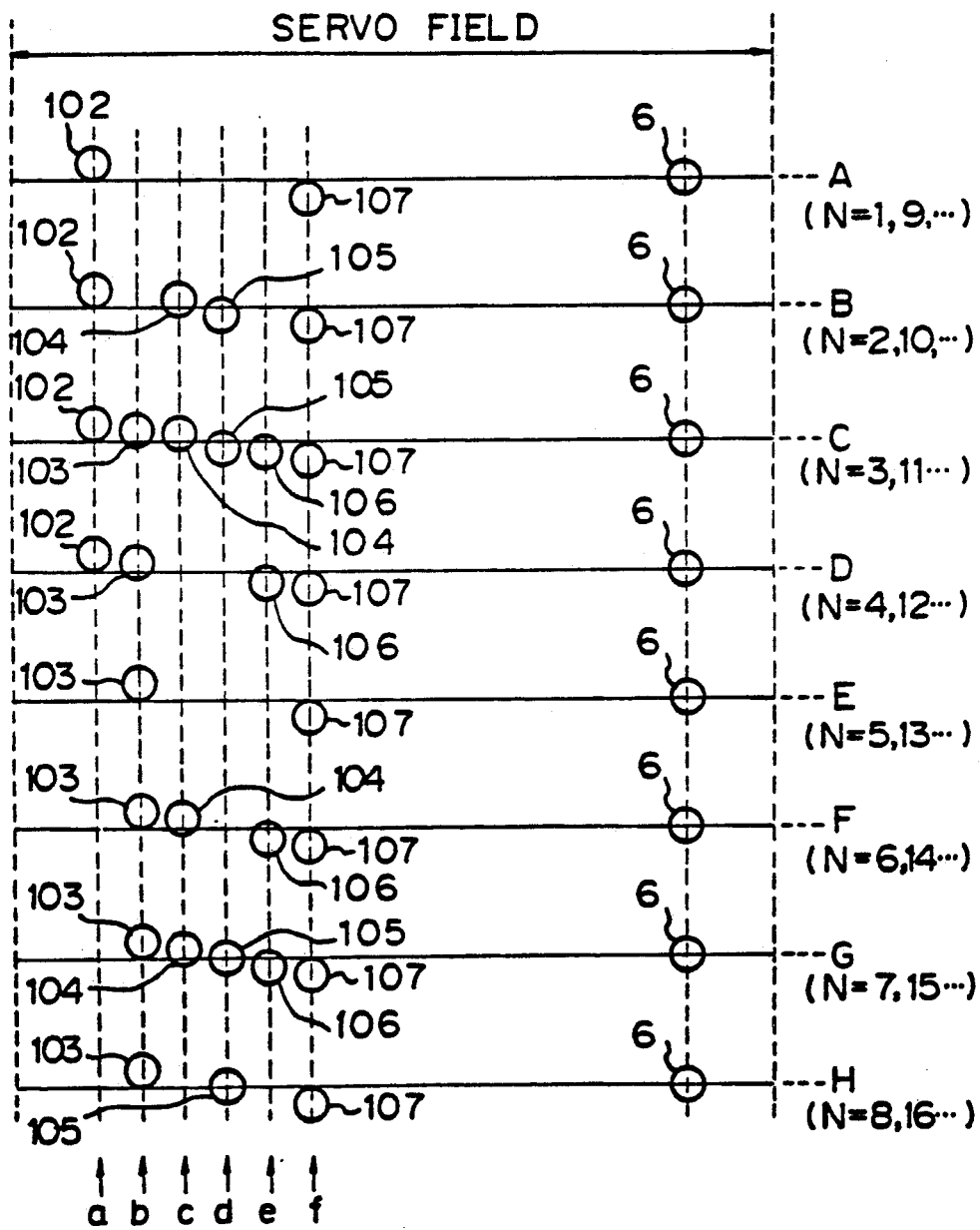

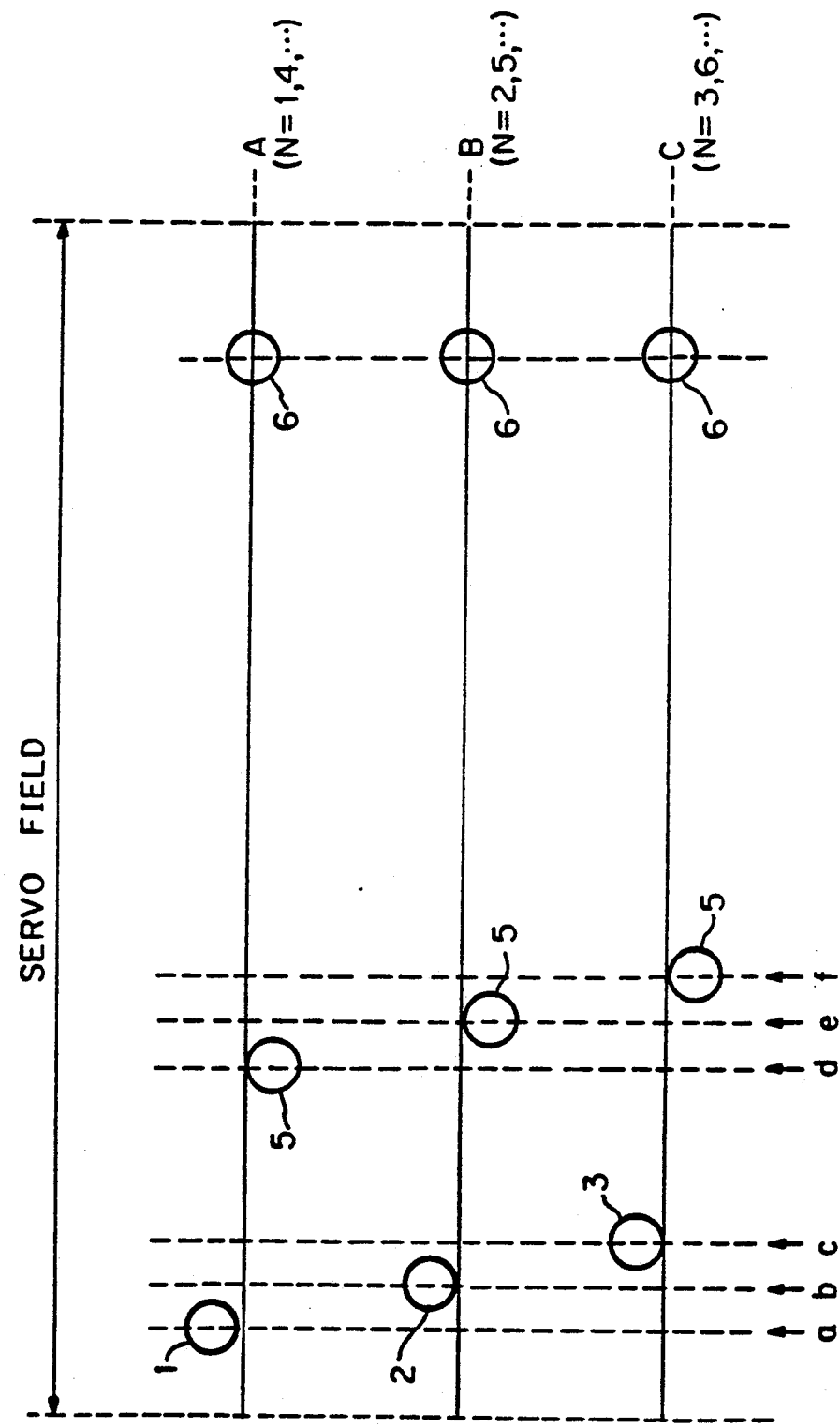

OPTICAL DISC WITH SERVO PATTERN PROVIDING ENHANCED RELIABILITY OF SERVO CLOCK DETECTION AND APPARATUS FOR ACCESSING THE OPTICAL DISC

This application is a division, of application Ser. No. 07/166,671, filed Mar. 11, 1988, now U.S. Pat. No. 5,063,546.

BACKGROUND OF THE INVENTION

1. Field of the Invention

The present invention is generally directed to an optical disc and an apparatus for driving the optical disc, and more particularly, both to an improvement of a preformat system which is marked beforehand for servo on the optical disc and to an optical disc driving apparatus suited to this improved preformat system.

2. Description of the Prior Art

Turning to FIG. 1, there is illustrated a diagram of a track sector format of a conventional optical disc which is shown, for instance, in "Optical Mass Data Storage 2", appearing on p. 112, Vol. 695 (1986) of the journal "SPIE". It can be observed from FIG. 1 that each track 200 per cycle is composed of 32 sectors (#0 through 31). A sector consists of 43 blocks (B1 through B43). Each individual block is constituted by a 2-byte servo field followed by a 16-byte data field. Hence, one track is split into 1376 blocks which is given by: $32 \times 43 = 1376$. FIG. 2 shows pit patterns of the servo field depicted in FIG. 1. Pits 201 and 203 are positioned above and below the under the center axis of a track 206, and pits 202 and 203 are above and below the center axis of another track 207. Pits 204 and 205 are clock pits. Tracking sensor signals can be obtained only from these pairs of wobbled pits. This type of servo system is referred to as a sampled servo, the principle of which is described, e.g., in "Third International Conference on Optical Mass Data Storage" appearing on p. 140, Vol. 529 (1985) of the journal "SPIE". A more detailed description is therefore omitted here. In an optical disc based on such a conventional system, it is feasible to obtain the tracking sensor signals only from pairs of pits within the servo fields, thereby requiring that no guide groove be designed for tracking. When performing accessing from one track to another at a high velocity, different servo field structures A and B, as described in FIG. 2, are alternately disposed for every 16 tracks. As a result, the amount of track-movement during accessing can be counted. In FIG. 2, the track number is given by:

$$1 + (N-1) \times 16$$

where $I = 1, 2, 3, \ldots 16$. In the servo field structure A, $N = 1, 3, 5 \ldots$, and in the servo field structure B, $N = 2, 4, 6, \ldots$. In the servo field structures A and B, the pits 201 and 202 of the two pairs of pits deviate in the track direction. In the case of effecting accessing while obliquely traversing the track, the number of tracks traversed can be obtained by detecting the positions of the pits. This situation will be explained by referring to FIG. 3. In FIG. 3, a multiplicity of central track lines 208 depicted in lateral solid lines are arranged at a spacing of, for example, 1.5 μm. In connection with the servo fields indicated by vertical dotted lines 209, the structures A and B are, as shown at the right end in the figure, alternately arranged for every 16 tracks. When providing a high-speed access, and assuming that a light spot travels along a locus 210, the light spot comes to intersect the servo fields at the points 211. The servo field structure can therefore be recognized from these points 211. Shown is one example of the thus recognized signal waveform 212. A "high" level indicates the servo field structure A, while a "low" level indicates the servo field structure B. Each time a state changes in signal waveform 212, it follows that 16 tracks have been counted. It is possible to count the number of tracks crossed by the light spot on the basis of the signal waveform 212 during the accessing, enabling an optical head to immediately reach the target track.

On the other hand, as is obvious from FIG. 3, a defect inherent to the sampled servo system is caused in that it is not feasible to detect whether the light spot is travelling toward the outer periphery or the inner periphery of the optical disc. The high-speed access involves the use of a method of controlling the velocity by fetching a speed detecting signal during the accessing of the optical head. This speed controlling method has more advantages than the well-known method of controlling the velocity with a glass scale provided outside. More specifically, the advantages provided are that such a glass scale is not needed, that miniaturization can be attained, and that a moderation in the required mechanical precision is permitted. Where this speed controlling method is applied to the prior art optical disc, however, a critical defect is caused in that directional detection is not possible. The reason for this will be elucidated. If an access direction is inverted during speed control, this directional inversion cannot be detected. Consequently, a control loop is put into a positive feedback state, resulting in runaway of the optical head. Such being the case, there is a possibility that the optical head will impinge upon a stopper provided on the inner or outer peripheral portion of the optical disc and will thereby be broken. Since the above-described conventional technique employs the servo field structures which vary alternately for every 16 tracks, assuming that the rotational frequency of the disc is 1800 rpm, the number of tracks can be counted up to this high velocity given by: $16 \times$ track pitch (1.5 μm)/block cycle $(1/30 \times 1/1376$ sec$) = 1.0$ m/sec. On the other hand, it is impossible to count the number of tracks if it is less than 16. For this reason, if the number of remaining tracks approximates to 16, there is no alternative but to employ one of the low speed track count techniques, this leading to a great obstacle to the desired reduction in access time. The low speed track count technique herein implies a method of counting the number of times the tracks are crossed on the basis of the tracking sensor signal of the sampled servo, where the maximum limit detection velocity is given by: track pitch/block cycle$=61.9$ mm/sec. When controlling the velocity by fetching a speed detecting signal from the optical disc during the accessing of the optical head, the detection of the speed signal is permitted when the optical head has travelled 16 tracks. Hence, the dead time of the speed detector increases, thereby making the speed control system unstable. In addition, broad band high speed control becomes impractical.

The sampled servo system utilizes a servo clock for the purpose of forming a trigger pulse signal to sample the first and second wobbled pits, a byte clock for sectioning the byte unit for data demodulation and a main clock serving as the reference from a PLL circuit synchronizing with the clock pits. In order to detect the clock pits the distance (19-bit length) between the second wobbled pit 203 and the clock pits 204 and 205 is set longer than the maximum distance (18-bit length) between pits in the data pattern. Thus, the pit detected immediately after the distance between two adjacent pits has exceeded the given value is identified as the clock pit, thus enabling detection of the clock pits. Differential processing of reproduced signals transmitted from the optical disc is a general practice for detecting clock pits. If data information pits consecutively exist on the inner portion of the optical disc as continuous bits, however, the optical frequency characteristics are poor and in some cases the reproduced peaks are not separated. In this case, the continuous pits are detected as an independent pit, and the distance between pits seemingly increases. Hence, if the apparent distance between pits in the data pattern exceeds 19 bits, it follows that an error in detection of the clock pits is created, and that the PLL does not normally function. Accordingly, the sampling of the sampled servo is not favourably effected, and the tracking servo does not work well. As a result, the optical head runs in a disordered fashion towards the inner and outer peripheries of the disc, and the record/reproduction operation cannot be effected properly. Furthermore, a problem arises in that if the clock pits are mistakenly detected during recording, and the synchronization of the PLL fails, false recording will be carried out.

SUMMARY OF THE INVENTION

It is a general object of the present invention to eliminate and solve the defects and problems inherent to the prior art optical disc.

It is one object of the present invention to provide an optical disc capable of detecting the moving direction of an optical head and increasing the resolving power of track counting without decreasing the maximum possible velocity of the track count, and a driving apparatus capable of controlling the moving velocity of the optical head in association with the optical disc of the present invention.

In one embodiment of the optical disc according to the present invention, each information track of the optical disc has a servo field including a pair of wobbled pits and a clock pit. The optical disc includes at least three different types of servo field. These different types of servo field appear in a predetermined sequence for every one or more contiguous information tracks.

A driving apparatus for driving the optical disc of this first embodiment comprises: direction detecting means for detecting both the type of each servo field on the basis of a signal converted from a light reflected from the optical disc and a change in the type of servo field and for detecting the moving direction of a movable portion of an optical head from the sequence of changes in type; and speed detecting means for detecting the magnitude of relative velocity of the movable portion in the radial direction with respect to the optical disc on the basis of the converted signal, whereby the velocity of the movable portion is controlled in response to output signals from the direction detecting means and from the speed detecting means.

In another embodiment of the optical disc according to the present invention, each information track of the optical disc has a servo field having a pair of wobbled pits, a clock pit and at least one intermediate pit disposed between the wobbled pits. The optical disc includes at least three different types of servo field. The position of the intermediate pits in any one of the at least three types of servo field is different from the remaining types. These different types of servo field appear in a predetermined sequence for every one or more contiguous information tracks.

A driving apparatus for driving the optical disc of this second embodiment comprises: direction detecting means for detecting the positional relationships between the wobbled pits and the intermediate pits on the basis of a signal converted from a light reflected from the optical disc and for detecting the moving direction of a movable portion of an optical head from the sequence of changes in positional relationship; and speed detecting means for detecting the magnitude of relative velocity of the movable portion in the radial direction with respect to the optical disc on the basis of the converted signal, whereby the velocity of the movable portion is controlled in response to output signals from the direction detecting means and from the speed detecting means.

With the optical disc constructed in the above-described manner it is feasible to detect the direction in which the optical head moves during the accessing operation, prevent runaway of the optical head and further augment the resolving power of the track count. Additionally, it is not only possible to attain an accessing operation in which the velocity of the optical head is controlled by detecting the moving velocity and direction of the optical head, but also to miniaturize the apparatus as a whole.

It is another object of the present invention to provide an optical disc capable of enhancing the reliability of detection of a clock pit in a simple manner without reducing the amount of user data, and an optical disc driving apparatus which enables a PLL circuit to stably function in association with such an optical disc.

In still another embodiment of the optical disc according to the present invention, each information track of the optical disc has a servo field including a first servo byte having a pair of wobbled pits and a second servo byte having a clock pit. The byte length of at least one of the first and second servo bytes is different from that of other bytes.

A driving apparatus for driving the optical disc of this third embodiment comprises: photoelectric means for detecting and converting the amount of light reflected from the optical disc into an electrical signal; clock extracting means for detecting the position of a clock pit on the basis of the electrical signal from the photoelectric means; PLL circuit means for synchronizing an output frequency therefrom with a clock signal obtained from the clock extracting means, whereby a frequency dividing ratio of the PLL circuit means is changed over in accordance with a bit length of a byte.

The thus constructed optical disc permits an increase in the distance between one of the wobbled pits and the clock pit, thereby enhancing the reliability of detection of clock pits and simplifying the constitution of the clock extracting circuit. The optical disc driving apparatus is capable of obtaining a byte clock signal adjusted to irregular sectioning of the bytes of the optical disc.

These and other objects and features of the invention will become more apparent after taking the following detailed description into account with reference to the accompanying drawings.

BRIEF DESCRIPTION OF THE DRAWINGS

FIGS. 4 and 19 are diagrams illustrating pit patterns in a first embodiment of an optical disc according to the present invention;

FIG. 17 is a diagram showing waveforms reproduced when reproducing the servo fields having the pit patterns depicted in FIG. 14; and FIG. 18 is a diagram showing one modified form of the pit patterns Of FIG. 14.

DETAILED DESCRIPTION OF THE PREFERRED EMBODIMENTS

Figure 4:
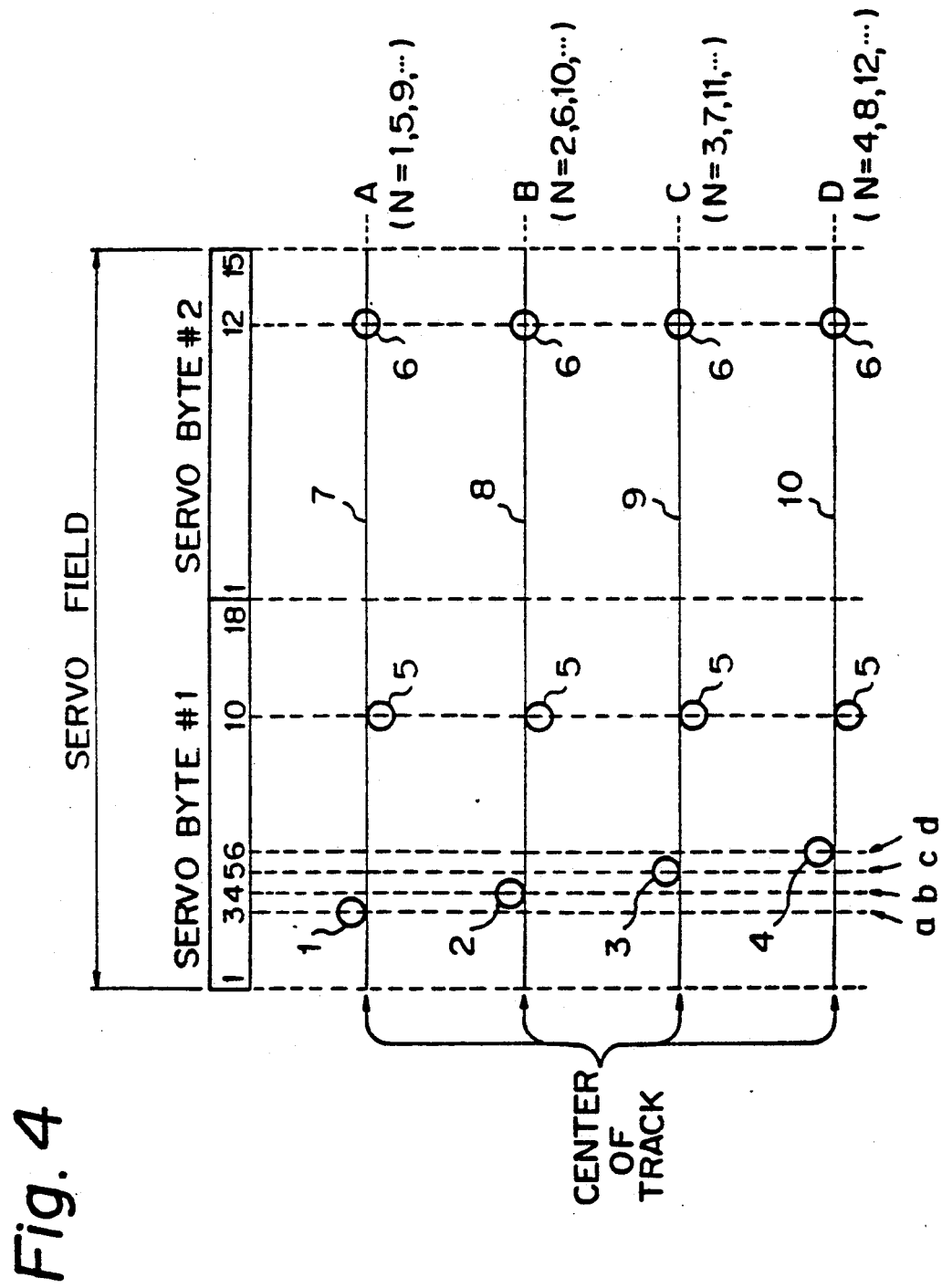

FIG. 4 illustrates a diagram of pit patterns of the servo fields in one embodiment of an optical disc in accordance with the present invention. As is obvious from FIG. 4, pits 1 and 5 are combined to form a pair of wobbled pits; and pits 2 and 5 form another pair of wobbled pits. There are also two pairs of wobbled pits 3 and 5, and 4 and 5. The pits of these paris deviate slightly above and below track center axes 7, 8, 9 and 10, respectively. The lefthand pits 1, 2, 3 and 4 of the respective paris of wobbled pits are positioned at different distances from the righthand pits 5 with a view to avoiding interference between the pits. The distance between the pits 5 and clock pits 6 defining the clock-reference for the information data is invariable. For instance, the wobbled pits 1 2, 3 and 4 are, as illustrated in figure, positioned at the 3rd, 4th, 5th and 6th bits of the first servo byte #1, and each wobbled pit 5 is positioned at the 10th bit of the servo byte #1 thus making the distance between the wobbled pits 4 and 5 four bits. The clock pits 6 exist at the 12th bit of the second servo byte #2. In order to enhance the reliability of detection of the clock pits, the distance between the wobbled pits 5 and the clock pits 6 is set at 20 bits. For this reason, the number of bits of the first servo byte is arranged to be 18, while the number of bits of the second servo byte #2 and each byte of the data fields are respectively set at 15. The clock pits 6 are disposed on the central axis of the respective tracks and serve both as the clock-reference for the recorded information data and as the reference for the timing at which sampling pulses for the wobbled pits are generated. The symbols a, b, c and d in FIG. 4 represent the timing position for the wobbled pits I, 2, 3 and 4 in reference to the clock pit 6. The symbols A, B, C and D indicate the servo field structures wherein the pits exist in the timing positions a, b, c and d. In FIG. 4, the track number is given by:

I+(N−1)×4 where I=1, 2, 3, 4. In the case of th servo field structure A, N=1, 5, 9, . . . ; in the structure B, N=2, 6, 10, . . . ; in the structure C, N=3, 7, 11, . . . ; and in the structure D, N=4, 8, 12 . . . Based on these relationships, the sequence of an array of the servo field structures may be indicated as: AAAABBBBCCCCDDDDAAAA . . . The same servo structure continues for four contiguous tracks, and 16 subsequent tracks constitute one cycle.

Figure 5:
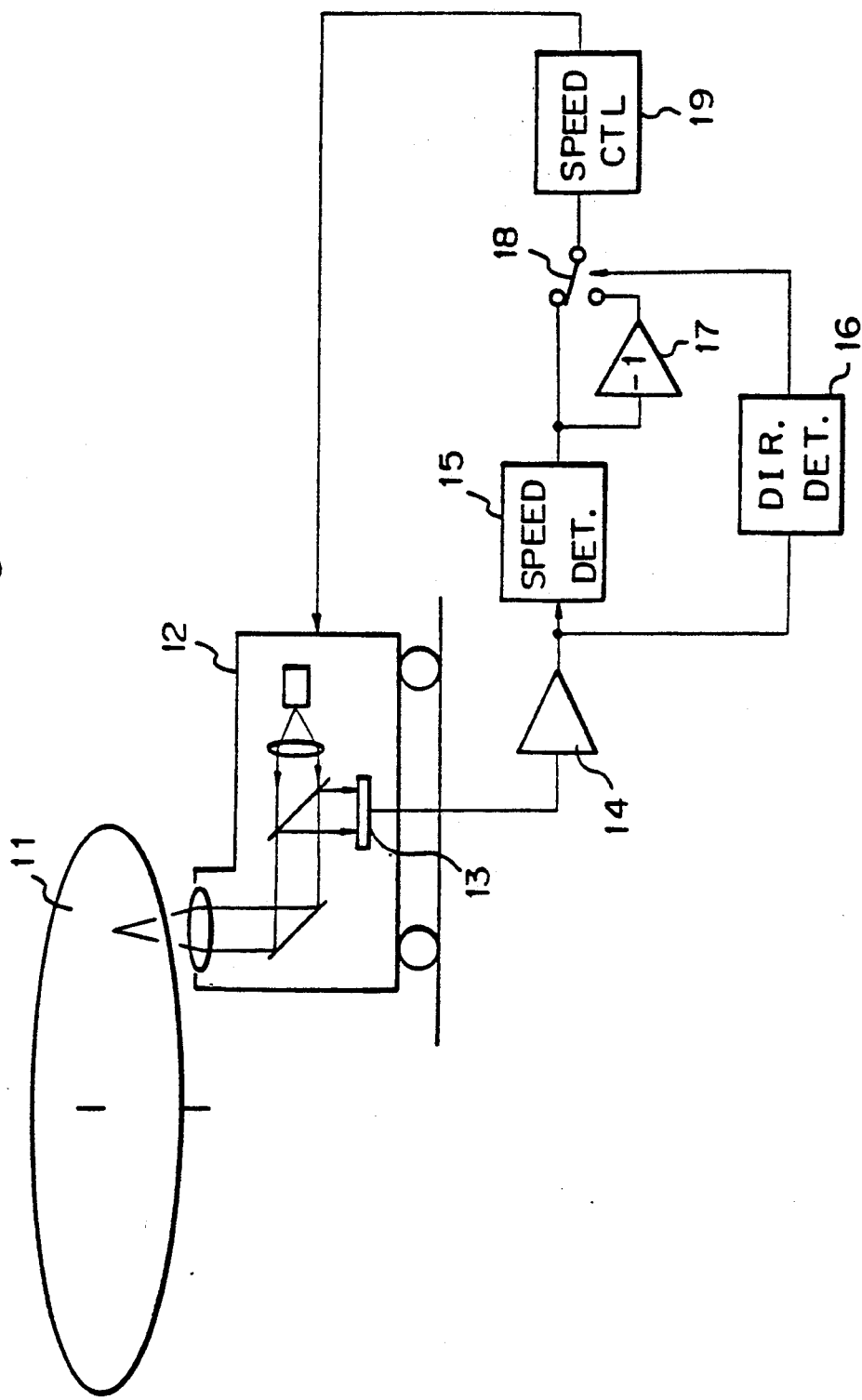
FIG. 5 is a schematic diagram of a driving apparatus for driving the optical disc depicted in FIG. 4.

FIG. 5 shows one example of a driving apparatus for the optical disc of FIG. 4. An optical head 12 is provided to record and reproduce information from the optical disc 11 depicted in FIG. 4. The information reproduced from the optical disc 11 is detected by a photo detector 13 and is then converted into an electric signal. The thus converted electric signal is further converted into a voltage signal by means of a pre-amplifier 14. Subsequent to this step, the voltage signal is supplied to a speed detecting circuit 15. The speed detecting circuit 15 serves to detect the magnitude of the velocity of the optical head 12 moving in the radial direction with respect to the optical disc 11 on the basis of the information which has been read from the optical disc 11 and converted into the voltage signal. The information converted into the voltage signal is also given to a direction detecting circuit 16, the information being utilized to detect the radial moving direction (toward the inner or outer periphery) of the optical head 12 with respect to the optical disc 11. An output from the speed detecting circuit 15 is supplied directly to one of the fixed contacts of a switch 18 and at the same time supplied via an inverting amplifier 17 to the other one of the fixed contacts of the switch 18. The switch 18 selects either an output signal of the speed detecting circuit 15 or an output signal of the inverting amplifier 17, depending on the polarity of an output from the direction detecting circuit 16. The output from the switch 18 is transmitted to a speed controlling circuit 19 which serves to control the velocity of the optical head 12 to allow accessing to a desired track to be effected.

Figure 6:
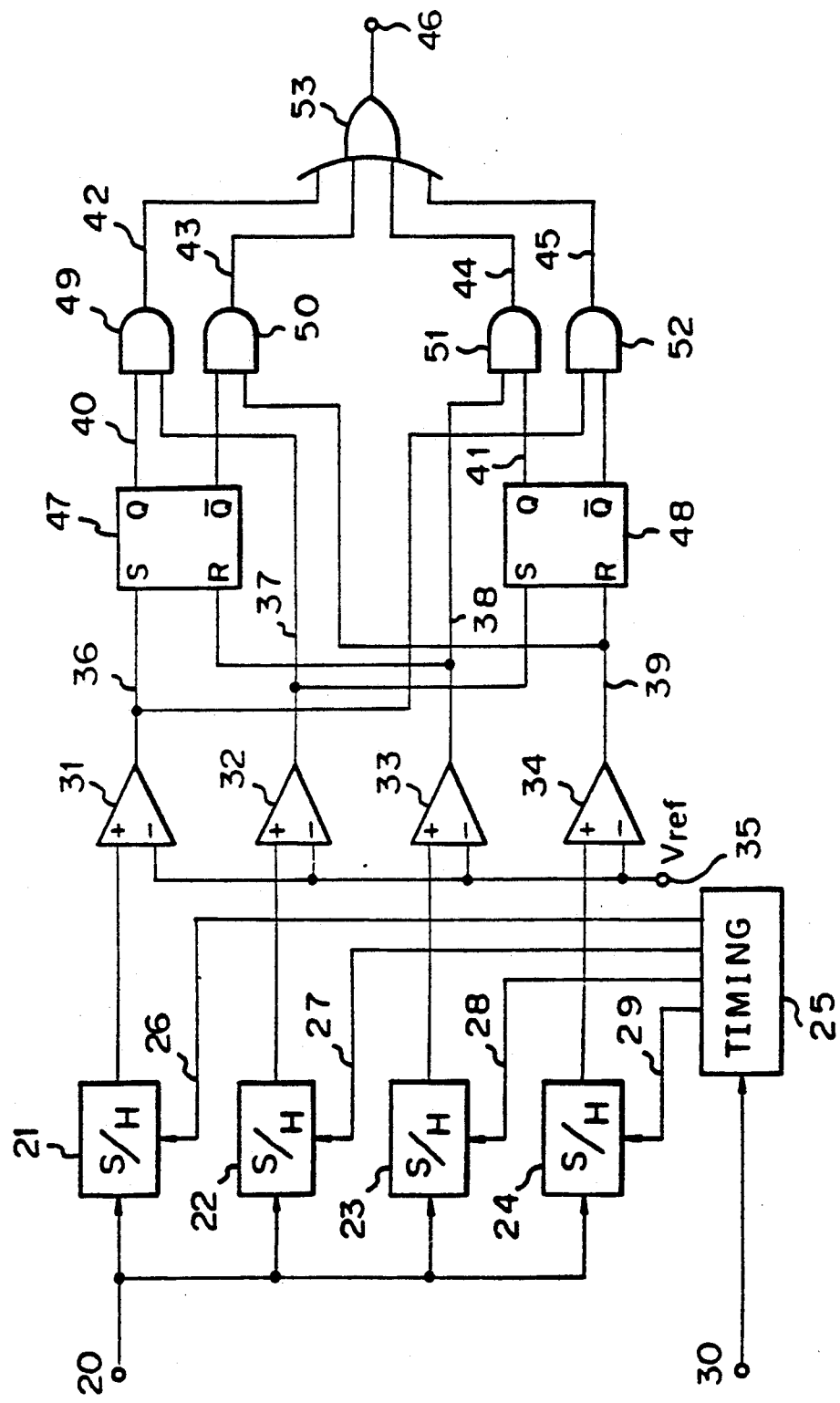
FIG. 6 is a block diagram showing a concrete example of a direction detecting circuit in the optical disc driving apparatus of FIG. 5.

Turning to FIG. 6 a concrete sample of the direction detecting circuit 16 is shown. In FIG. 6, a reproduced signal which has been reproduced from the optical disc 11 and converted into the voltage signal is input from an input terminal 20 to four sample and hold circuits 21, 22, 23 and 24, respectively. Control signals 26 to 29 for the individual sample and hold circuits are sampling pulses provided in the timing position a through d by a timing adjusting circuit 25 on the basis of the clock signals input from an input terminal 30, e.g., clock signal generated by detecting the aforementioned clock pits 6. The output signals of the sample and hold circuits are respectively compared with a reference voltage Vref input from an input terminal 35 in comparators 31 through 34 which produce output signals 36 through 39. The output signal 36 is applied to a SET input of a flip-flop 47 and the output signal 38 is applied to a RESET input thereof; and a Q-output 40 thereof and the output signal 37 are input to an AND gate 49, The $\overline{Q}$-output of the flip-flop 47 and the output signal 39 are input to an AND gate 50. The output signal 37 is applied to a SET input of a flip-flop 48 and the output signal 39 is applied to a RESET input thereof; and a Q-output 41 thereof and the output signal 38 are input to an AND gate 51. The $\overline{Q}$-output of the flip-flop 48 and the output signal 36 are input to an AND gate 52. Output signals 42 to 45 of the respective AND gates 49 to 52 are input to an OR gate 53, thereby forming a direction detecting signal 46.

One embodiment of the optical disc driving apparatus according to the present invention will hereinafter be described with reference to FIGS. 5 through 9.

Figure 7:
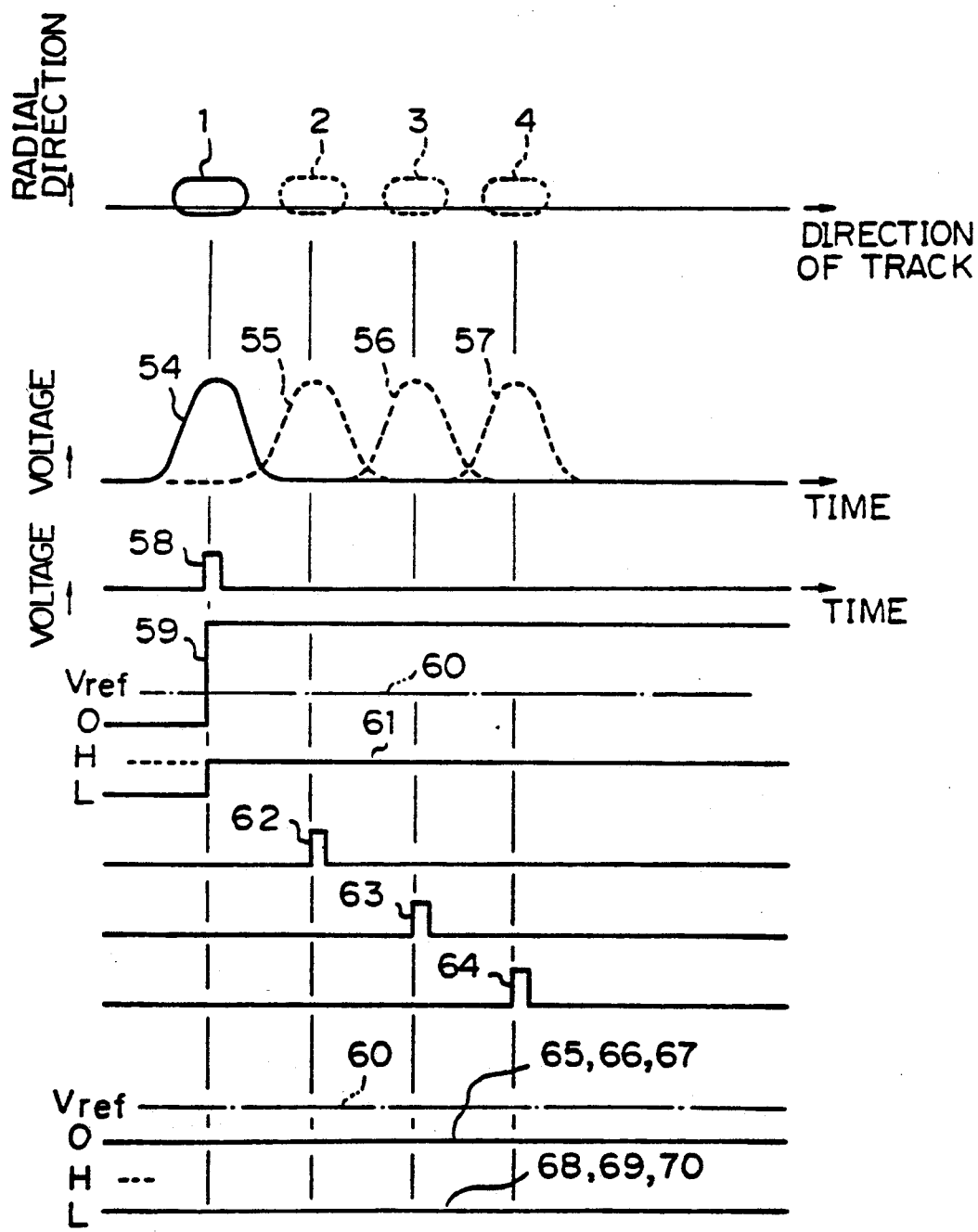
FIG. 7 is an explanatory signal waveform diagram showing the operation of the optical disc driving apparatus of FIG. 5.

FIG. 7 illustrates reproduced waveforms from the pits and a sampling situation when reproducing information on the servo field structure A. A reproduced waveform 54 from the pit 1 is depicted with a solid line, while imaginary waveforms 55, 56 and 57 reproduced from other imaginary pits 2, 3 and 4 are indicated by broken lines. The reproduced waveforms 54 are input from the input terminal 20 depicted in FIG. 6 to the sample and hold circuits 21 through 24, where the reproduced waveforms 54 are to be sampled by the sampling pulses 58, 62, 63 and 64 in the timing position a through d. A waveform 59 indicates an output waveform of the sample and hold circuit 21, and the peak value of the waveform 54 is sampled by the sampling pulse 58. The resultant value is thereafter held. Output waveforms 59 and 65 through 67 of the sample and hold circuits el through 24 are compared with the reference voltage Vref (shown by a dotted line 60) by means of the comparators 31 through 34, respectively. The output signals 36 to 39 thereof are shown in the form of waveforms 61, 68, 69 and 70 in FIG. 7. Namely, the output signal 36 assumes a "high" level, whereas other output signals 37 to 39 assume a "low" level during the period in which the light spot is travelling on the servo field structure A. Similarly, in the case of the servo field structure B the output signal 37 comes to the "high" level, in the servo field structure C, the output signal 38 reaches the "high" level, and in the servo field structure D, the output signal 39 assumes the "high" level. In these cases the remaining output signals remain at the "low" level.

Figure 3:
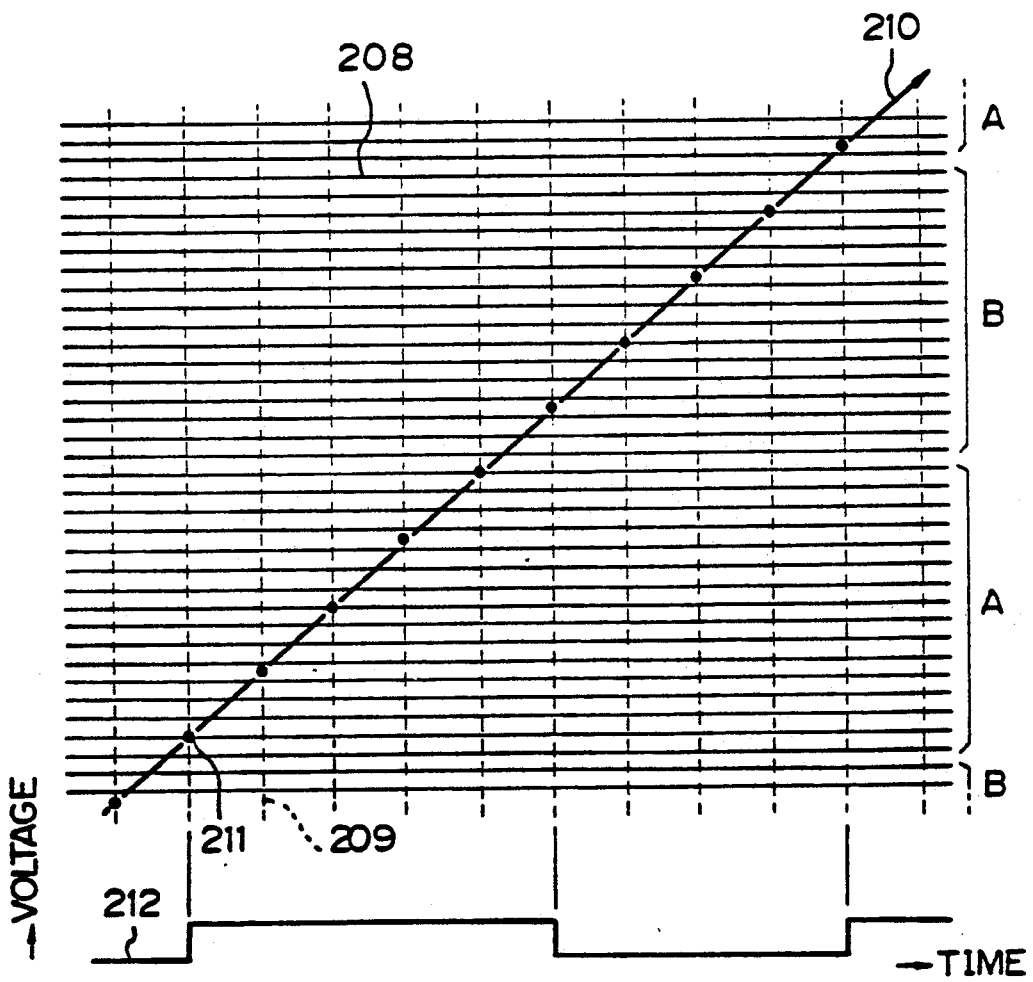
FIG. 3 is a diagram showing an array of servo field structures of the optical disc depicted in FIG. 1 and also a situation where a light spot scans the surface of the optical disc.
Figure 8A:
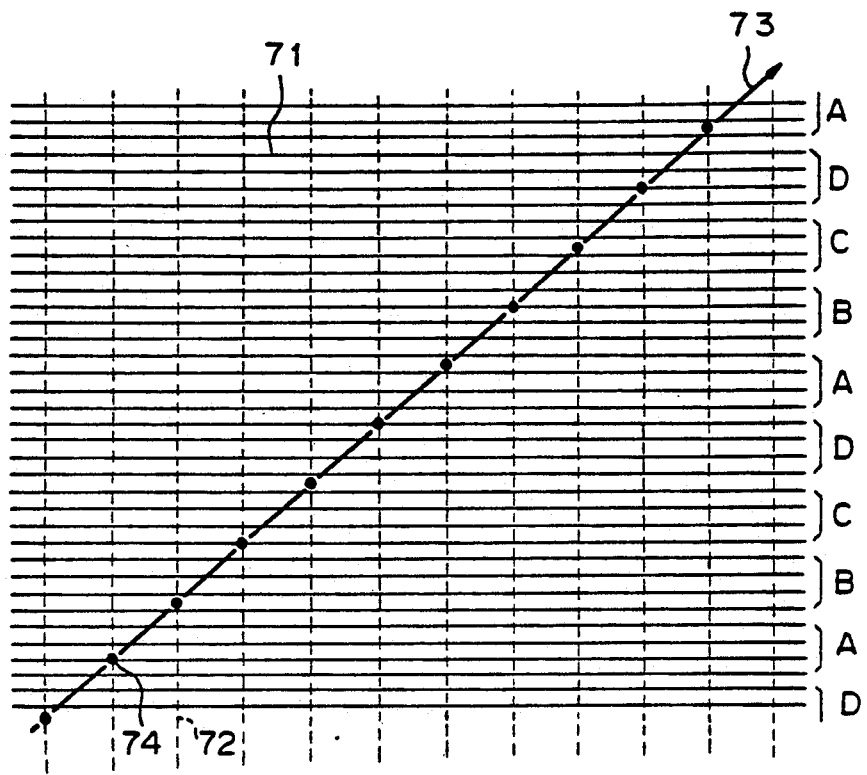
FIG. 8, consisting of (a) and (b), is a diagram illustrating both an array of servo field structures of the optical disc depicted in FIG. 4 and a situation where the light spot scans the surface of the optical disc.
Figure 8B:
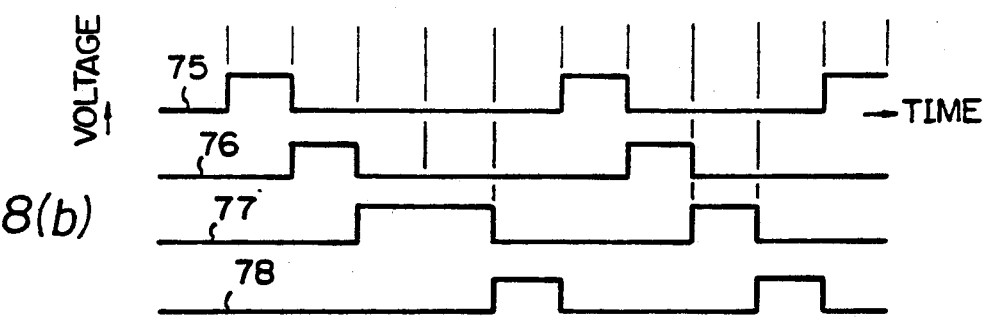

FIG. 8 is an illustration of the servo field structures of FIG. 4 that are arrayed on the surface of the optical disc, and of a situation where the light spot scans the optical disc surface. As in the case of FIG. 3, horizontal solid lines 71 of FIG. 8(a) indicate a plurality of track center axes arranged at a pitch of 1.5 μm, while vertical dotted lines 72 show the positions of the servo fields. When the optical head effects a high-speed access, the light spot moves along an oblique line 73. The numeral 74 designates a plurality of points at which the light spot intersects the servo fields. In FIG. 8, the servo field structures are, as illustrated at the right of the figure, so arranged as to repeat the pattern AAAABBBBCCCCDDDD. The light spot moves in the order of A→B→C→D. Waveforms 75 through 78 depicted in FIG. 8(b) are the waveforms of the output signals 36 through 39 of FIG. 6. It ca be observed from FIG. 8 that the "high" level appears in the output signals 36, 37, 38 and 39 in sequence as the light spot moves. When the light spot traverses the tracks in the opposite direction, i.e., moves in the order of D→C→B→A, the "high" level appears in the output signals 39, 38, 37 and 36 in sequence.

Figure 9A:
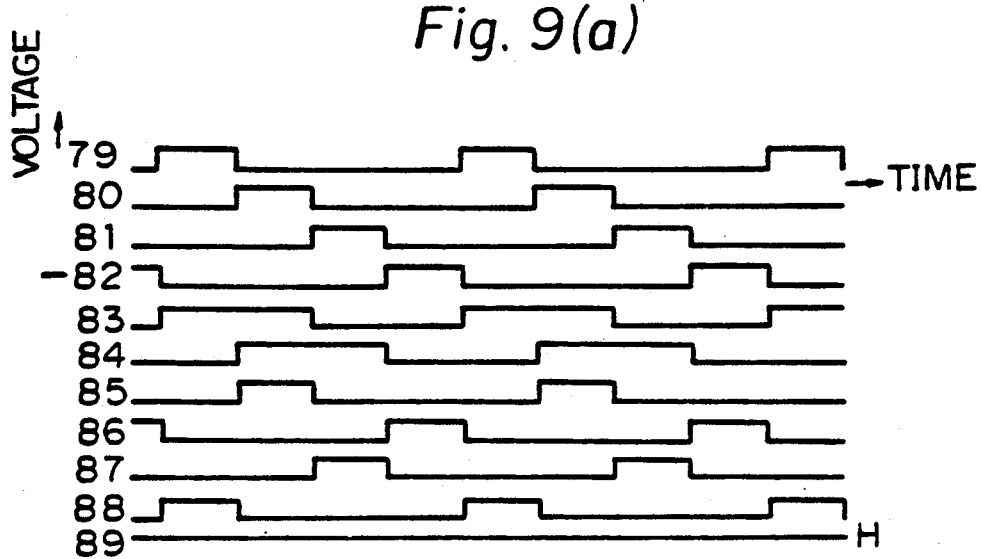
FIGS. 9(a) and 9(b) are diagrams each showing output waveforms in respective portions of the direction detecting circuit depicted in FIG. 6 when the light spot scans, as illustrated in FIG. 8, the surface of the optical disc.
Figure 9B:
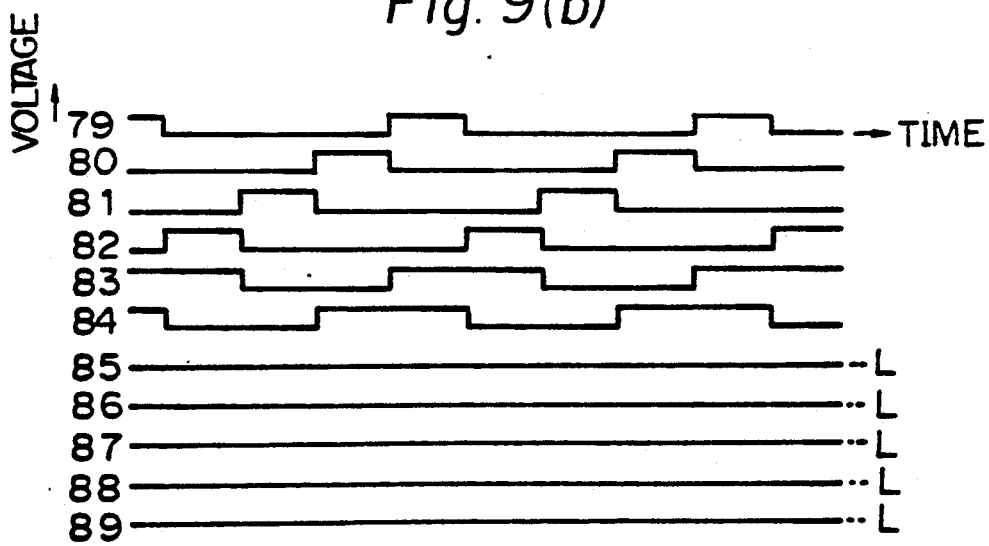

FIG. 9(a) shows signal waveforms when the light spot travels in the same direction as that shown in FIG. 8(a), while FIG. 9(b) illustrates the signal waveforms when the light spot moves in the opposite direction. In the figure, the numerals 79 through 82 denote the signal waveforms of the signals 36 to 39 depicted in FIG. 6, respectively. A waveform 83 corresponds to the Q-output signal 40 of the flip-flop 47; a waveform 84 the Q-output signal 41 of the flip-flop 48; a waveform 85 the output signal 42 of the AND circuit 49; a waveform 86 the output signal 43 of the AND circuit 50; a waveform 87 the output signal 44 of the AND circuit 51; and a waveform 88 the output signal 45 of the AND circuit 52. A waveform 89 indicates the output signal 46, depicted in FIG. 5, of the direction detecting circuit 16 which logically adds the above-described four signals 42 through 44. This output signal 46 assumes the "high" level in FIG. 9(a), whereas the output signal 46 assumes the "low" level in FIG. 9(b). Hence, it follows that the moving direction of the light spot with respect to the tracks can be detected from the signal level of the output signal 46.

The speed detecting circuit 15 of FIG. 5 obtains the moving velocity of the light head by dividing a numerical value of 4× track pitch (1.5 μm) by a value representing the period for which each of the signal waveforms 75 through 78 of FIG. 8 is at the "high" level. The prior art optical disc enables detection of the velocity of the optical head for every 16 tracks. In contrast with this, it is practical to detect the velocity for every four tracks in the first embodiment. Accordingly, the dead time of the speed detecting circuit can be reduced, thereby enhancing the stability of an associated speed control system. The fact that the track count can be performed for every four tracks ensures a more careful count of the number of tracks. Although the speed detecting circuit 15 essentially performs the function of detecting the magnitude of the velocity at which the optical head moves, it is possible to prevent the speed control system from going into a positive feedback state by combining the direction detecting circuit 16 with the speed detection circuit. In FIG. 5, the output of the direction detecting circuit 16 is arranged to be at the "high" level when the light spot, viz., the optical head 12, moves in the outer direction, but the output of the direction detecting circuit 16 is arranged to assume the "low" level when the light spot moves in the inner direction. The switch 18 is changed over to the speed detecting circuit 15 when the output level of the direction detecting circuit 16 remains "high". If this output level is "low", the switch 18 is changed over to the inverting amplifying circuit 17. This arrangement permits an analog signal input to a speed control circuit 19 to become a signal having a directional information: when the optical head 12 travels in the outer direction, this signal is positive; and When travelling in the inner direction, this signal is negative. In this manner, even if the moving direction of the optical head is reversed during the accessing operation, the control stability is assured without any possibility that the speed control system will be put in the positive feedback state.

Figure 10:
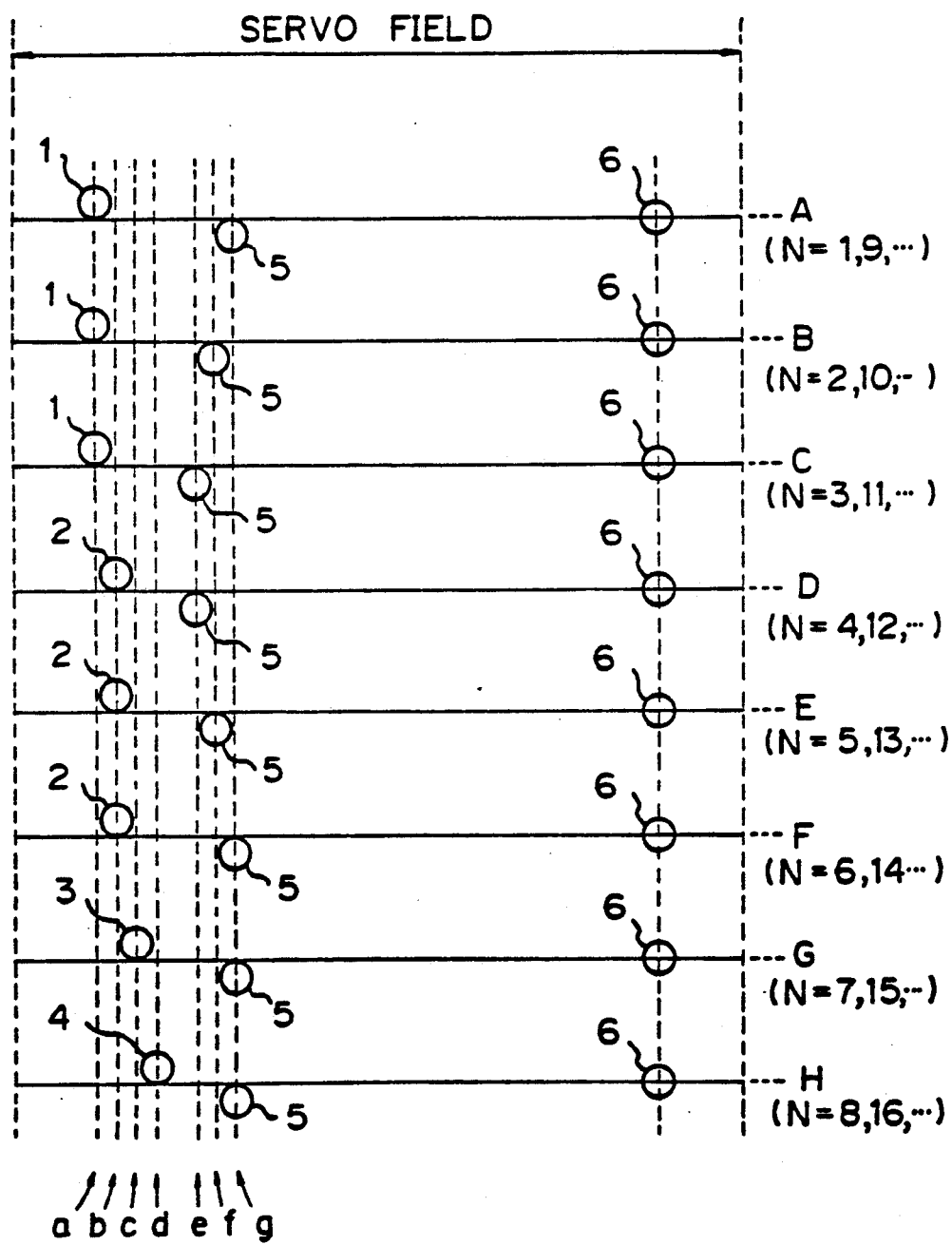
FIG. 10 is a diagram illustrating one modified form of the pit patterns of FIG. 4.

According to the optical disc in the first embodiment of FIG. 4, the distance between the righthand pit 5 of the pair of wobbled pits and the clock pit 6 is kept constant. This distance may, however, be varied for every one or more information tracks as shown in FIG. 19. Turning to FIG. 10, a modified form of the pit pattern structures of the optical disc in the first embodiment is shown. In FIG. 10, the pits 1 and 5 constitute a pair of wobbled pits. Similarly, there are also three pairs of wobbled pits 2 and 5, 3 and 5, and 4 and 5. The pits 6 are identified as clock pits. As is apparent from the figure, not only is the distance between the clock pit 6 and the lefthand pits 1 through 4 variable, but the distance between the righthand pit 5 and the clock pit 6 is also variable. The timing positions of the respective pits 1 to 4 are the same as those described in the first embodiment of FIG. 4. The timing positions of the pits 5 constitute three stages as indicated by e, f and g in FIG. 10. As described above, the two pits of each pair independently deviate in position, whereby it is feasible for a predetermined pit space to accommodate much information. In FIG. 10, eight types of servo field structures A through H are shown. In the case of the structure A, the wobbled pits exist in the timing positions a and g. In the structure B, t he wobbled pits exist in the timing positions a and f; in the structure C, a and c; in the structure D, b and e; in the structure E, b and f; in the structure F, b and g; in the structure G, c and g; and in the structure H, d and g. The track number is given as:

$$I+(N-1)\times 2$$

where I=1, 2. When taking the structure A, N equals 1, 9, ...; in the structure B, N equals 2, 10, ...; in the structure C, N equals 3, 11, ...; in the structure D, N equals 4, 12, ...; in the structure E, N equals 5, 13, ...; in the structure F, N equals 6, 14, ...; in the structure G, N equals 7, 15, ...; and the structure H, N equals 8, 16, ... Namely, the servo field structures are arranged by repeating the unit pattern AABBCC-DDEEFFGGHH which is constituted by 16 tracks. Because any combination of two timing positions in which the wobbled pits exist is peculiar in regard to all the servo field structures A through H. when the light spot passes through the servo fields, it is always possible to specify the servo filed structure on which the light spot is positioned. This implies that, as is obvious from the explanation of the aforementioned embodiment, the moving direction of the light spot with respect to the tracks can be detected. Although the maximum detecting velocity in the modified example of FIG. 10 is the same as that in the above-described embodiment of FIG. 4 because of the repeated 16 tracks patterns, the dead time of the speed detecting circuit is reduced to one-half as small as that in the embodiment of FIG. 4, and the stability of the speed control system is further improved, because the velocity can be detected for every two tracks. The resolving power of the track count is also doubled as compared with that in the embodiment of FIG. 4.

It is noted that the distances between the lefthand pits 1 through 4 of wobbled pits and the righthand pits 5 may be constant, the distances between the pairs of wobbled pits and the clock pits being varied. In this case, since the distance between the wobbled pits is fixed, the degree of interference between the pits becomes constant, thereby obtaining a stable tracking sensor signal.

In the optical disc in the first embodiment, there are four types of distances between the lefthand pit of the wobbled pits and the clock pit, and any one of these distances appears for four contiguous information tracks. However, the distances between the lefthand pit of the wobbled pits and the clock pit may be changed at three stages or more to enable the directional detection to be achieved. The number of information tracks which have the same distance between the wobbled pit and the clock pit may be any arbitrary number equal to one or more. The lower such a number is, the more the dead time of the speed direction diminishes, whereby a more elaborate track count can be achieved.

In the first embodiment, the entire optical head is driven for access. However, the present invention can be applied to a separation type optical head in which only a portion of the optical head is driven for access.

The present invention can further be applied to a write-once type optical disc, an erasable type optical disc including a photo magnetic disc or a read-only type optical disc including a compact disc.

Figure 11:
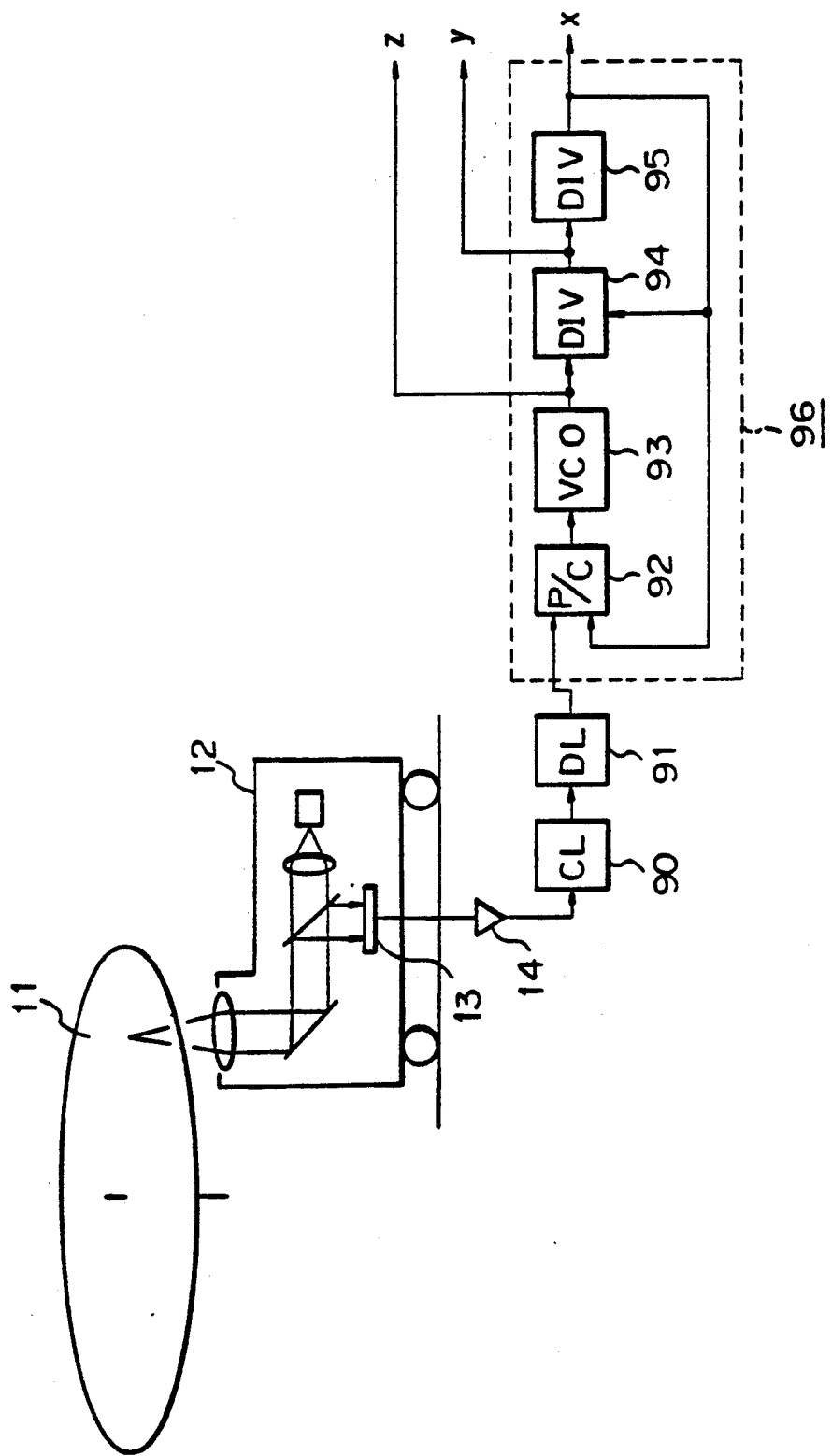
FIG. 11 is a schematic diagram showing another example of the driving apparatus for driving the optical disc of FIG. 4.

FIG. 11 illustrates another example of an apparatus for driving the optical disc shown in FIG. 4. Like components are given the same reference symbols as those of FIG. 5. The reproduced information read from the optical disc 11 is transmitted to the photodetector 13 and the preamplifier 14 and is thereby converted into a volt age signal. The reproduced signal which has been converted into the voltage signal is supplied to a clock extracting circuit 90 in which the positions of the clock pits are detected. The extracted clock signal is delayed by a delay circuit 91 and is then supplied to one input of a phase comparing circuit 92. An output signal from the phase comparing circuit 92 is used for controlling the output frequency of a VCO 93. The main clock signal, the output from the VCO 93, is divided by 15 or 18 by means of a variable frequency dividing circuit 94. A byte clock signal, the output from the variable frequency divider circuit 94, is further divided by 18 by a frequency divider circuit 95. A servo clock signal, the output from the frequency divider circuit 95, is applied to the variable frequency circuit 94 to change a frequency dividing ratio. Simultaneously, the servo clock signal is further applied to the other input of the phase comparing circuit 92. The phase comparing circuit 92, the VCO 93, the variable frequency divider circuit 94 and the frequency divider circuit 95 are combined to constitute a PLL 96.

Next, the operation of the optical disc driving apparatus of FIG. 11 will be described.

Figure 1:
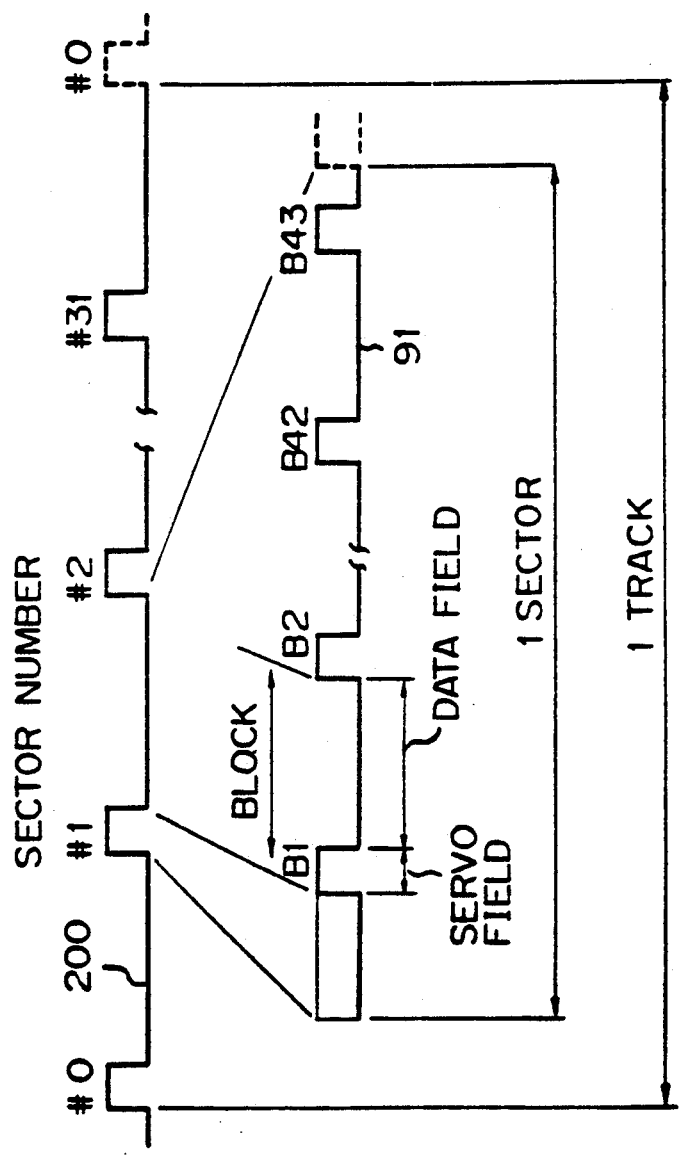
FIG. 1 is a diagram illustrating a track sector format of a prior art optical disc.
Figure 2:
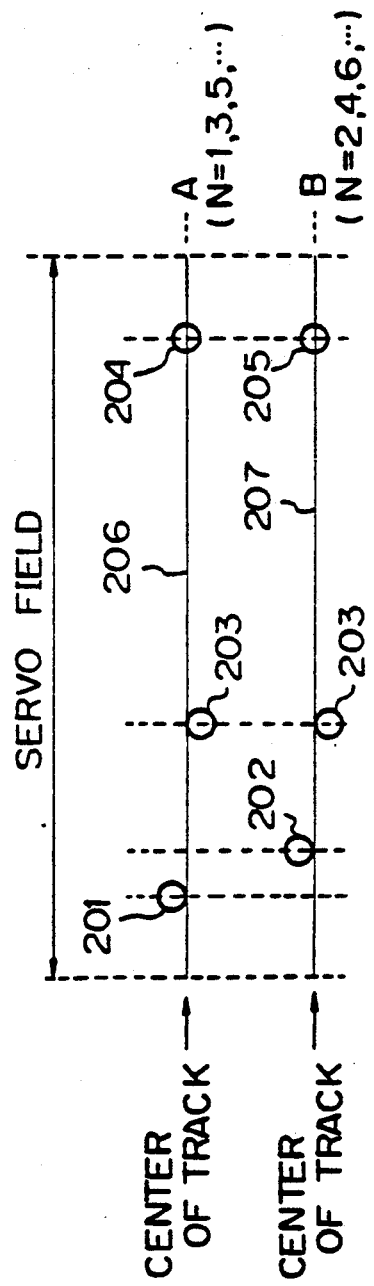
FIG. 2 is a diagram illustrating the structure of a pit pattern of the optical disc depicted in FIG. 1.
Figure 12:
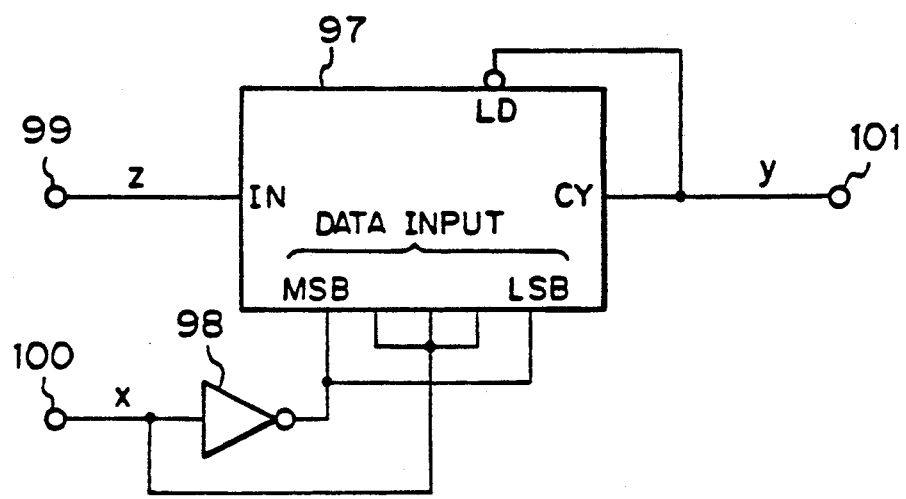
FIG. 12 is a diagram showing a concrete example of a variable frequency dividing circuit in the driving apparatus of FIG. 11.
Figure 13:
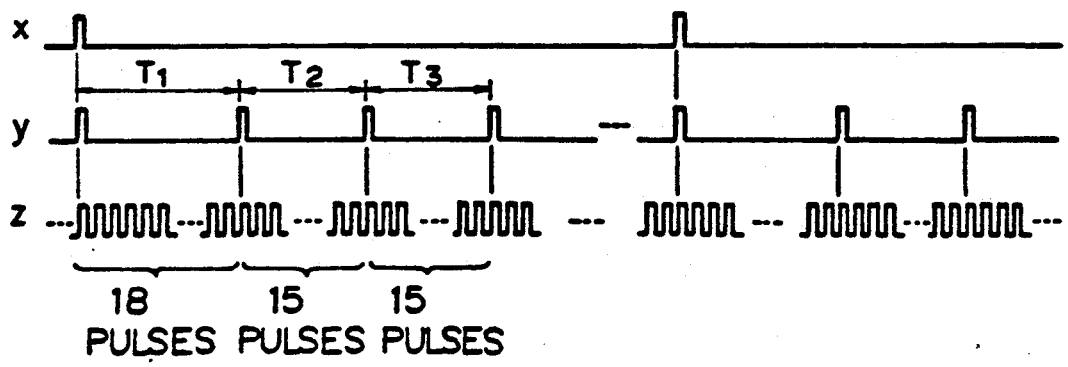
FIG. 13 is an explanatory signal waveform diagram showing the operation of the variable frequency dividing circuit depicted in FIG. 12.

As shown in FIG. 4, the distance between the pit 5 and the clock pit 6 is 20 bits, i.e. one bit longer than the conventional example shown in FIG. 2. Therefore, the present invention provides a sufficiently high reliability, even when adopting essentially the same clock extracting method as the prior art. In the clock extracting circuit 90, when detecting the fact that the inter-pit distance is 20 bits, the thus detected pit is the clock pit. The servo clock signal x regarded as one output signal from the PLL 96 synchronizes with the clock signal extracted by the clock extracting circuit 90 and delayed by the delay circuit 91. FIG. 12 shows the construction of a variable frequency divider circuit 94 incorporated in the PLL. The variable frequency divider circuit 94 comprises a presettable 5-bit counter 97 and an inverter 98. The main clock signal z, the output from the VCO 93 is supplied to one input terminal 99, while the servo clock signal x, the output from the frequency divider circuit 95, is supplied to the other input terminal 100. The output y from the variable frequency divider circuit 94 is supplied from an output terminal 101 to the frequency divider circuit 95. When the servo clock signal x at the input terminal 100 assumes a "high" level, the counter 97 is preset to 14. Upon receiving 18 pulses, the counter 97 outputs the byte clock signal y from the output terminal 101, and at the same time reloads the preset value corresponding to the level of the input terminal 100. Where the servo clock signal x remains "low", the counter 97 is preset to 17. Upon receiving 15 pulses, the counter 97 outputs the byte clock signal y and reloads a preset value corresponding to the level of the input signal at the terminal 100. As discussed above, only when the servo clock signal x is at the "high" level does the variable frequency divider circuit 94 function to divide the frequency of the output from the VCO by 18. If the input terminal 100 is kept "low", the circuit 94 divides the frequency of the output from the VCO by 15. FIG. 13 is an illustration of signal waveforms of the three clock signals x, y and z. The byte clock signals y are, after the servo clock signal x has been generated, generated at the moment when 18 pulses of the main clock signal 2 have been counted, and, subsequently, at the moment when a further 15 pulses have been counted. The thus obtained byte clock signals y correspond to the byte structures on the optical disc. Since the delay in the delay circuit 91 can be so set that the timing of generating the byte clock signal y corresponds to the sections of the byte structures, it is possible to have the period $T_1$ between the first and second byte clock signals correspond to the first servo byte, the period $T_2$ between the second and third byte clock signals to the second servo byte #2, and the period $T_3$ between the third and fourth byte clock signals to the first byte of the subsequent data field, whereby normal data demodulation is executed. The pulses for sampling the positions of the wobbled pits are generated when a predetermined number of the main clock signals z have been counted in reference to the servo clock signals x. In the servo field structures depicted in FIG. 4, three bits are added to one block, and, hence, the pit length decreases by 3/(15×18)=1.1%. However, this amount is so small that there is no problem in practical terms. Since no modification is made except to the clock frequency, the format of the data fields may be the same as the conventional format. There is no drop in recording capacity either.

According to the first embodiment of FIG. 4, the wobbled pits 1 through 4 are at four different positions, thereby improving the performance of access. Even if the positions of the wobbled pits are set at two stages as in the conventional example shown in FIG. 2, the reliability of the clock extraction can be enhanced by making the number of bits in the first servo byte #1 different from that of other bytes.

In the first embodiment of FIG. 4, the distance between the wobbled pit 5 and the clock pit 6 is set at a 20-bit length. However, if the distance is more than 20 bits, the reliability of the clock extraction is further improved. If the distance between the wobbled pit 5 and the clock pit 6 is set at an 18-bit length or a 19-bit length, the same effects can be obtained by making the number of bits in the first servo byte #1 greater than that of other bytes.

In accordance with the embodiment of FIG. 4, the number of bits in the first servo byte #1 is set to be higher than that of the second servo byte #2. However, like effects can be attained by causing the positions of the clock pits to deviate backwards, even when the number of bits in the second servo byte #2 exceeds that of the first servo byte #1. Furthermore the number of bits in the servo bytes #1 and #2 may increase.

Figure 14:
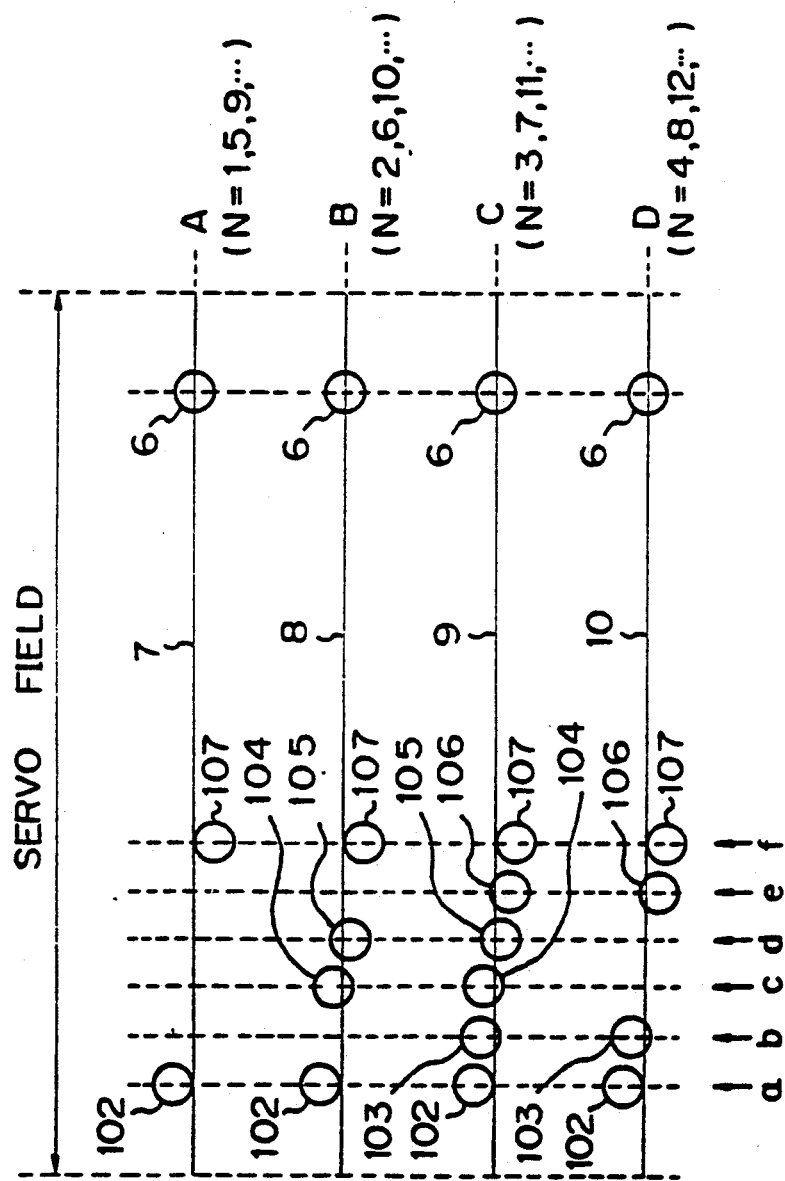
FIG. 14 is a diagram illustrating pit patterns in a second embodiment of the optical disc according to the present invention.

Referring to FIG. 14, a diagram of pit patterns of the servo fields in the second embodiment of the optical disc according to the present invention is shown. Like components are indicated by the same reference symbols as those depicted in FIG. 4. It can be observed from FIG. 14 that pairs of wobbled pits 102 and 107 are provided so as to slightly deviate upward and downward from central axes 7 through 10 of the tracks, respectively. The distance between the pit 107 and the clock pit 6 serving as the clock reference for information data corresponds to the travelling time of the light spot. Such a distance in the inner peripheral portion generally differs from that in the outer peripheral portion of the optical disc. The distance is, however, constant in FIG. 14, because the tracks are arranged close to each other. The clock pits 6 are disposed on the central axes of the tracks and serve as the clock reference both for the recorded information data and for generation of sampling pulses for the wobbled pits. Intermediate pits 103 through 106 are interposed between the wobbled pits 102 and 107. In FIG. 14, the symbols a through f represent timing positions, the clock pit 6 serving as the reference for the pits 102 to 107. A servo field structure A is arranged such that the pits exist in the positions a and f; a structure B is characterized in that the pits exist in the positions a, c, d and f; in a structure C, the pits are in the positions a through f; and in a structure D, the pits are disposed in the positions a, b, e and f. The intermediate pits 103 through 106 are placed in symmetry with respect to the wobbled pits 102 and 107. In this case, the track number is given by:

$$1+(N-1)\times 4$$

where I=1, 2, 3, 4. In the case of the servo field structure A, N=1, 5, 9, . . . ; in the structure B, N=2, 6, 10, . . . ; in the structure C, N=3, 7, 11, . . . ; and in the structure D, N=4, 8, 12, . . . According to these relations, the servo field structures are arranged like this: AAAABBBBCCCCDDDDAAAA . . . The same servo field structure continues for four subsequent tracks, and one cycle is comprised of 16 tracks.

The pit pattern structures depicted in FIG. 14 have four different kinds of relationship between the wobbled pits and the intermediate pits disposed therebetween, and the same positional relationships are, as illustrated in FIG. 8, repeated for every four information tracks. If such positional relationship change in more than three stages, the directional detection becomes feasible. The number of information tracks having the same positional relationship may be an arbitrary number equal to one or more. The dead time of the speed detection diminishes as the number of t racks decreases. In consequence, an elaborate track count is achieved.

Figure 15:
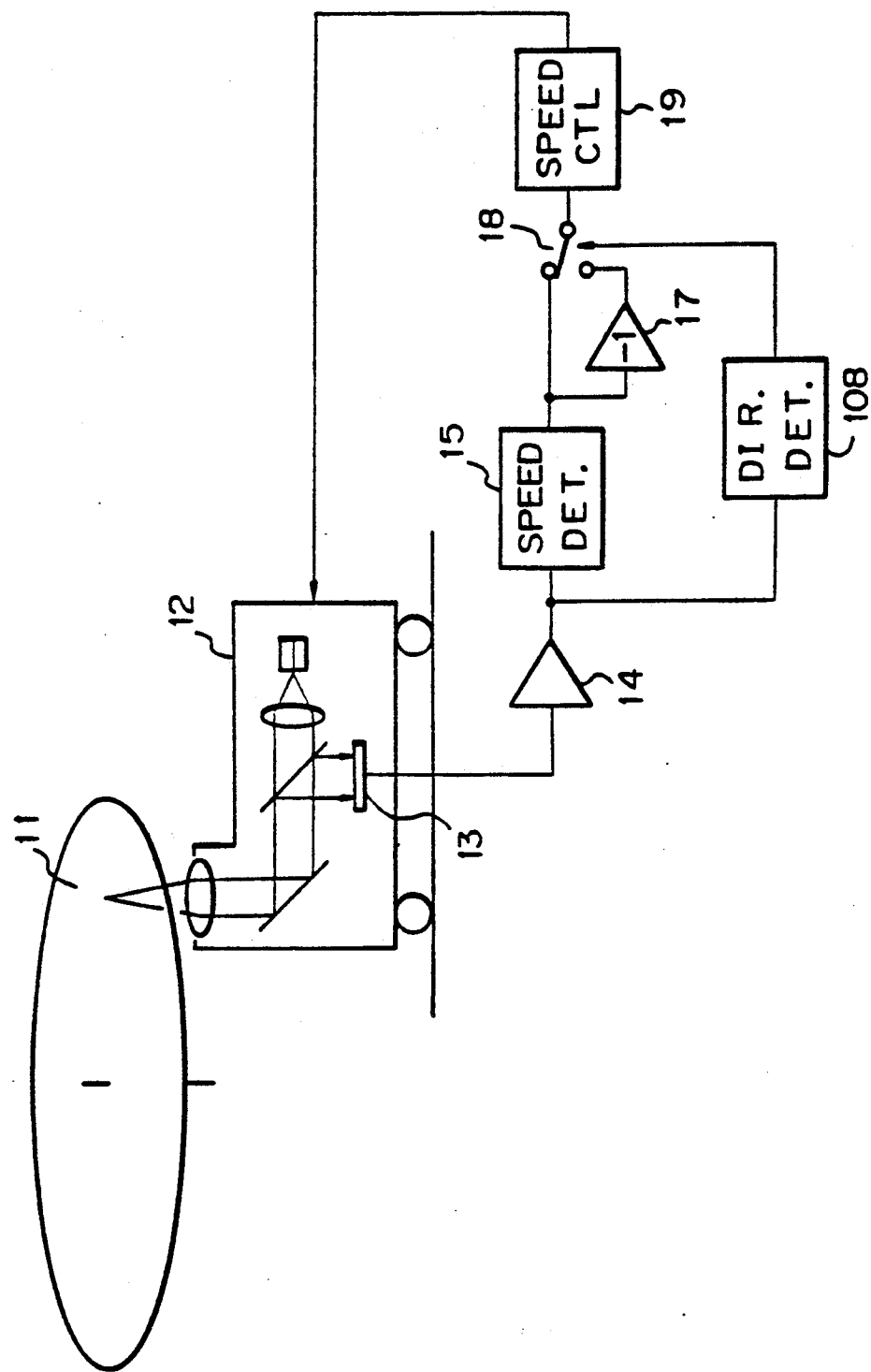
FIG. 15 is a schematic diagram of the driving apparatus for driving the optical disc depicted in FIG. 14.

FIG. 15 shows one example of an apparatus for driving an optical disc having the servo field structures illustrated in FIG. 14. The only difference between the optical disc driving apparatus of FIG. 15 and that depicted in FIG. 5 resides in the construction of the direction detecting circuit, but the operation of these two driving apparatuses is substantially the same.

Figure 16:
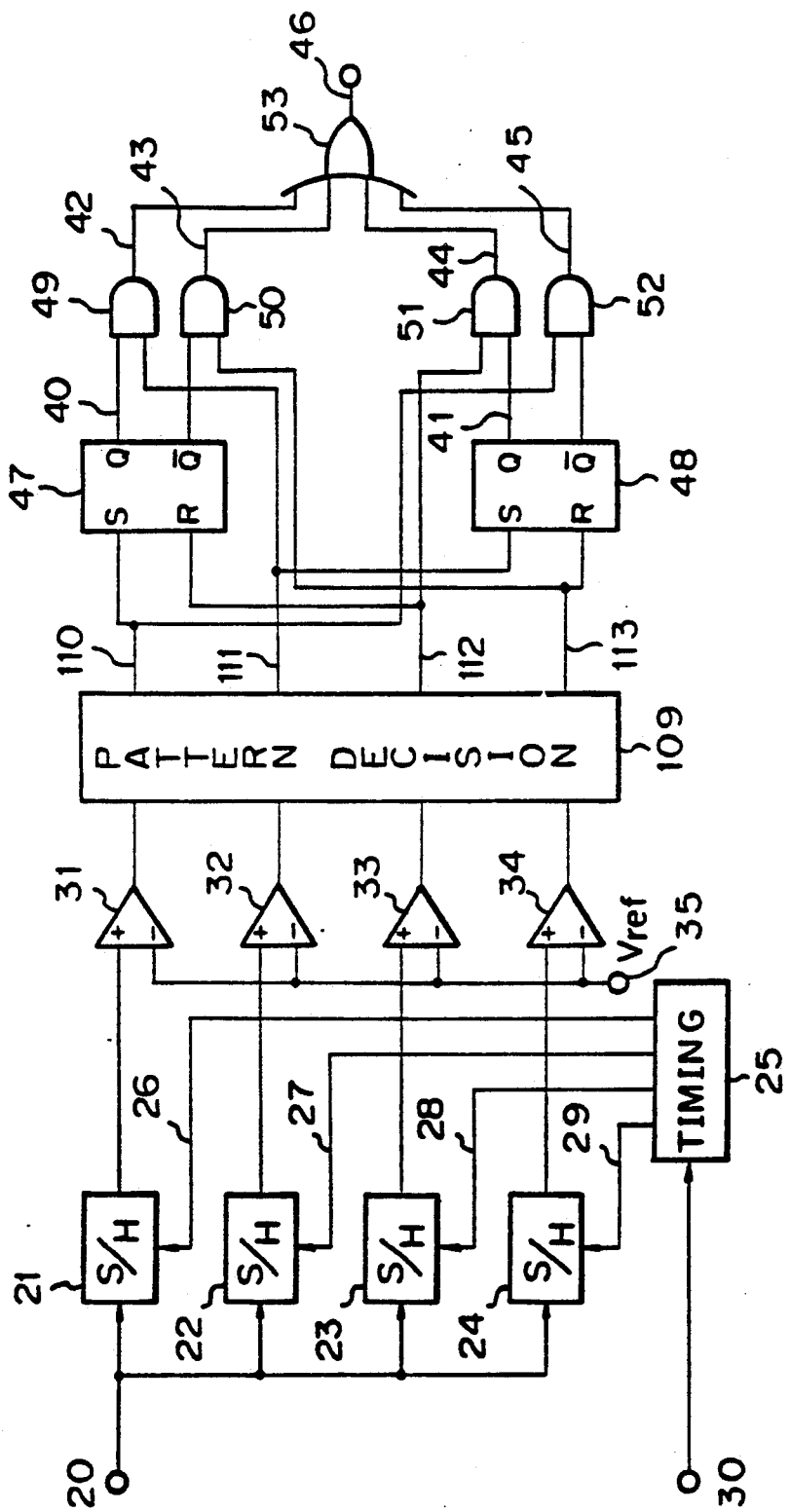
FIG. 16 is a block diagram showing a concrete example of the direction detecting circuit in the optical driving apparatus of FIG. 15.

FIG. 16 shows a concrete sample of a direction detecting circuit 108 in the optical disc driving apparatus of FIG. 15. In FIG. 16, like components are marked with the same reference numerals as those in FIG. 6. The output signals from the sample and hold circuits 21 to 24 are compared with the reference voltage Vref input from the input terminal 35 in the comparators 31 to 34, and are then input to a pattern decision circuit 109. An output signal 110 from the pattern decision circuit 109 is applied to a SET input of a flip-flop 47, while an output signal 112 is applied to a RESET input thereof. A Q-output 140 of the flip-flop 47 and an output signal 111 are input to an AND gate 49. A $\bar{Q}$-output of the flip-flop 47 and an output signal 113 are input to an AND gate 50. The signal 111 is also applied to a SET input of a flip-flop 48, and an output signal 113 is likewise applied to a RESET input thereof. A Q-output of the flip-flop 48 and the signal 112 are input to an AND gate 51. A $\bar{Q}$-output of the flip-flop 48 and the signal 110 are input to an AND gate 52. Output signals 42 through 45 of the respective AND gates 49 through 52 are input to an OR gate 53, whereby these signals are changed to the direction detecting signal 46.

The functions of the optical disc depicted in FIG. 14 and the optical disc driving apparatus shown in FIG. 15 will next be explained with reference to FIG. 17.

FIG. 17 illustrates both waveforms of the signals reproduced from the pits and a sampling operation. In FIG. 17, the waveforms generated when reproducing the servo field structures A to D are indicated by solid lines 114 through 117. Broken lines 118 to 123 respectively indicate the waveforms reproduced from imaginary independent pits 102 to 107 which are in the positions shown in the figure with respect to the center axis of the track. The reproduced waveforms 114 to 117 are input from the input terminal 20 shown in FIG. 16 to the sample and hold circuits 21 to 24, and are subsequently sampled by the sampling pulses in the timing positions b, c, d and e. Next, the comparators 31 to 34 make comparisons between the reference voltage Vref and the sampled analog signals, and convert these analog signals into digital signals assuming a "high" or "low" level, which in turn are input to the pattern decision circuit 109. The pattern decision circuit 109 decides that the input signal is reproduced from the servo field structure D if the input signal is "high" in the timing positions b and e, but they are "low" in the timing positions c and d. In this way, the pattern decision circuit 109 performs its function of distinguishing between the servo field structures. In the case of the servo field structure A, the output signal 110 is "high". In the case of the structure B, the output signal 111 is "high". When the structure is C, the output signal 112 is "high". When the structure is D, the output signal 113 is "high". In other words, when the light spot moves on the servo field structure A, the output signal 110 assumes a "high" level, whereas other output signals 111 through 113 are at a "low" level. Similarly, when the light spot moves on the servo field structure B, only the output signal 111 is at the "high" level. Where the light spot travels on the servo field structure C, the output signal 112 alone reaches the "high" level. When the light spot travels on the servo field structure D, only the output signal 113 comes to the "high" level. Other output signals are kept at the "low" level.

A situation in which the light spot scans the surface of the optical disc having the servo field structures arrayed in the manner illustrated in FIG. 14 is the same as that in FIG. 6. The servo field structures are, as shown on the right in FIG. 8, so arranged as to repeat the pattern AAAABBBBCCCCDDDD. Where the light spot moves in the order of A→B→C→D, the waveforms 75 to 78 depicted in FIG. 8 correspond to the waveforms of the output signals 110 to 113, respectively. When the light spot travels in the order of A→B→C÷D, the "high" level appears in sequence from the signal 110 to the signal 113. If the light spot traverses tracks in the order of D→C→B→A, viz., in the opposite direction, the "high" level appears in sequence from the signal 113 to the signal 110.

The operations of the respective components of the direction detecting circuit of FIG. 16 will likewise be described with reference to the time charts of FIGS. 9(a) and 9(b). The output signals 110 to 113 transmitted from the pattern decision circuit 109 correspond to the waveforms 79 to 82 shown in FIG. 9. More specifically, the waveform 83 indicates the Q-output signal 40 of the flip-flop 47; the waveform 84 indicates the Q-output signal 41 of the flip-flop 48; the waveform 85 represents the output signal 42 of the AND circuit 49; the waveform 86 shows the output signal 43 of the AND circuit 50; the waveform 87 indicates the output signal 44 of the AND circuit 51; and finally the waveform 88 represents the output signal 45 of the AND circuit 52. The waveform 89 indicates the output signal 46 of the direction detecting circuit 108 which logically adds the abovedescribed four signals 42 through 45. As can be understood from the above, the output of the direction detecting circuit 108 comes to the "high" or "low" level in accordance with the direction in which the light spot travels, and it is therefore possible to detect the moving direction of the light spot with respect to the tracks.

As is made clear by the description given above, the following effects are provided. The velocity can be detected for every 4 tracks in the servo field structures shown in FIG. 14, and hence the dead time of the speed detecting circuit can be reduced as in the case of the servo field structures of FIG. 4, and the speed control system has an enhanced stability. It is also feasible to conduct the track count for every 4 tracks, thereby providing an elaborate count. Additionally, the positive feedback of the speed control system can be avoided by utilizing the speed detecting circuit 15 in combination with the direction detecting circuit 108. If the moving direction is reversed during the accessing operation of the optical head, the speed control system is never brought into the positive feedback state, ensuring stable control.

Based on the pit pattern structures illustrated in FIG. 14, the distance between the wobbled pits on each information track is constant. Such a distance can, however, be changed for every one or more information tracks. FIG. 18 shows a modified version of the pit pattern structures of the optical disc shown in FIG. 14. Referring to FIG. 18, eight servo field structures A through H are provided. The pits 102 and 107 form a pair of wobbled pits, and there is another pair of wobbled pits 103 and 107. As in the embodiment of FIG. 14, the numeral 6 designates the clock pit. In FIG. 18, the symbols a through f represent the timing positions for the pits 102 through 107. As shown in the figure, the distance between the wobbled pits is varied, with the result that a given pit space is capable of accommodating more information. In the servo field structures A to D, the wobbled pits exist in the timing positions a and f, and, in the servo field structures E to H, the wobbled pits exist in the timing positions b and f. The track number is obtained by the following formula:

1+(N−1)×2 where I = 1, 2. When taking the servo field structure A, N=1, 9, . . . ; in the structure B, N=2, 10, . . . , in the structure C, N=3, 11, . . . ; in the structure D, N=4, 12, . . . ; in the structure E, N=5, 13, . . . ; in the structure F, N=6, 14, . . . , in the structure G, N=7, 15, . . . ; and in the structure H, N=8, 16, . . . Consequently, the servo field structures in FIG. 18 are arrayed in the sequence AABBCCDDEEFFGGHH. The arrangement is based on repetition of a 16-track cycle. Combinations both of the positions in which the wobbled pits exist and of the positions of the intermediate pits provided therebetween are different from each other in all the servo field structures A through H. As a result, it is definitely possible to specify the servo field structure on which the light spot is positioned when passing through the servo fields. For this reason, it follows that the moving direction of the light spot with respect to the tracks can be detected, as in the abovedescribed embodiment. In the example of FIG. 18, because the 16 tracks constitute one repetitive cycle, the maximum detection velocity is the same as that in the embodiment of FIG. 14. However, detection for every two tracks is feasible, so that the dead time of the speed detecting circuit diminishes by one-half relative to that in the embodiment of FIG. 14. In addition, the stability of the speed control system is further improved. The resolving power of the track count is doubled as compared with that in the embodiment of FIG. 14.

In the pit pattern structures illustrated in FIGS. 14 and 18, the intermediate pits disposed between the pairs of wobbled pits may be wobbled, or alternatively positioned on the central axes of the tracks.

According to the second embodiment, the intermediate pits are disposed in symmetry with respect to the pairs of wobbled pits. This arrangement aims at offsetting influences caused by the intermediate pits when obtaining tracking sensor signals by taking a difference between the reflection signals from the wobbled pits.

This arrangement is not, however, indispensable for accomplishing the objects of the present invention. Hence, the intermediate pits may be arranged asymmetrically.

The invention has been described in detail with particular reference to certain embodiments thereof, but it will be understood that variations and modifications can be effected within the spirit and scope of the invention.

What is claimed is:

1. In an optical disc having a plurality of information tracks and each information track having a servo field including a first servo byte having a pair of wobbled pits, a second servo byte having a clock pit, and a plurality of data bytes each having a uniform data byte length;

the improvement characterized in that:

the byte length of at least one of the first and second servo bytes is greater than the data byte length;

said information tracks having at least three different types of servo field, wherein the different types of servo field appear in a predetermined sequence, each type of servo field appearing for two or more continuous information tracks.

2. An accessing apparatus for accessing an optical disc having a plurality of information tracks, each information track having a data field including a plurality of data bytes, each information track further having a servo field including a first servo byte having a pair of wobbled pits and a second servo byte having a clock pit, the byte length of at least one of the first and second servo bytes being different from that of the plurality of data bytes, the apparatus comprising:

a movable portion of an optical head adapted to be moved in the radial direction, the optical head for emitting a light onto the optical disc;

photoelectric means for receiving a light reflected from the optical disc and converting the received light into an electrical signal;

clock extracting means for detecting the position of the clock pit on the basis of the electrical signal from the photoelectric means and generating a corresponding clock signal; and phase-locked loop circuit means for generating a phase-locked loop clock signal and synchronizing an output frequency of the phase-locked loop clock signal with a frequency of the clock signal obtained from the clock extracting means, whereby a frequency dividing ratio of the phase-locked loop circuit means varies between preset ratios, said preset ratios being preset in accordance with the byte lengths of the first and second servo bytes and the data bytes.

* * * * *